US005680337A

United States Patent [19]

Pedersen et al.

[11] Patent Number: 5,680,337

[45] Date of Patent: Oct. 21, 1997

[54] COHERENCE OPTIMIZED ACTIVE ADAPTIVE CONTROL SYSTEM

[75] Inventors: Douglas G. Pedersen, Middleton; Trevor A. Laak, Madison, both of Wis.

[73] Assignee: Digisonix, Inc., Middleton, Wis.

[21] Appl. No.: 598,036

[22] Filed: Feb. 7, 1996

Related U.S. Application Data

[63] Continuation of Ser. No. 247,561, May 23, 1994, abandoned.

[51] Int. Cl.[6] .......... G06F 17/10

[52] U.S. Cl. .......... 364/724.19; 381/71; 364/724.07

[58] Field of Search .......... 364/724.19, 724.2, 364/724.07, 724.01; 381/71

[56] References Cited

U.S. PATENT DOCUMENTS

| | | | |
|---|---|---|---|
| 4,238,746 | 12/1980 | McCool et al. | 333/166 |
| 4,677,676 | 6/1987 | Eriksson | 381/71 |
| 4,677,677 | 6/1987 | Eriksson | 381/71 |
| 4,736,431 | 4/1988 | Allie et al. | 381/71 |
| 4,811,309 | 3/1989 | Eriksson et al. | 367/140 |
| 4,815,139 | 3/1989 | Eriksson et al. | 381/71 |
| 4,837,834 | 6/1989 | Allie | 381/71 |
| 4,903,249 | 2/1990 | Hoops et al. | 367/140 |
| 4,987,598 | 1/1991 | Eriksson | 381/71 |
| 5,022,082 | 6/1991 | Eriksson et al. | 381/71 |
| 5,033,082 | 7/1991 | Eriksson et al. | 379/410 |
| 5,168,459 | 12/1992 | Hiller | 364/724.19 |
| 5,172,416 | 12/1992 | Allie et al. | 381/71 |
| 5,206,911 | 4/1993 | Eriksson et al. | 381/71 |
| 5,216,721 | 6/1993 | Melton | 381/71 |
| 5,216,722 | 6/1993 | Popovich | 381/71 |
| 5,230,006 | 7/1993 | Kurokami | 364/724.2 |
| 5,278,780 | 1/1994 | Eguchi | 364/724.19 |
| 5,278,913 | 1/1994 | Delfosse et al. | 381/71 |
| 5,283,834 | 2/1994 | Goodman et al. | 381/71 |
| 5,337,366 | 8/1994 | Eguchi et al. | 381/71 |
| 5,388,160 | 2/1995 | Hashimoto et al. | 381/71 |
| 5,390,255 | 2/1995 | Popovich | 381/71 |
| 5,396,561 | 3/1995 | Popovich et al. | 381/71 |

OTHER PUBLICATIONS

"Adaptive Noise Cancelling: Principles and Applications", B. Widrow et al, Proceeding of The IEEE, vol. 63, No. 12, Dec., 1975, pp. 1692–1716.

*Primary Examiner*—David H. Malzahn
*Attorney, Agent, or Firm*—Andrus, Sceales, Starke & Sawall

[57] ABSTRACT

Coherence optimization is provided in an active adaptive control system. The adaptive control model (16) has a model input (18) receiving a reference signal (8) from a reference input transducer (4), an error input (20) receiving an error signal (14) from an error transducer (10), and a model output (22) outputting a correction signal (24) to an output transducer (26) to introduce a control signal matching the system input signal (6) to minimize the error at the error input. Coherence in the system is determined, and a coherence filter (27; 28; 29) is provided according to the determined coherence. Preferably, one or more of the error signal (14), reference signal (8) and correction signal (24) is coherence filtered.

73 Claims, 14 Drawing Sheets

COHERENCE OPTIMIZED ACTIVE ADAPTIVE CONTROL SYSTEM

This is a continuation of application Ser. No. 08/247,561, filed May 23, 1994 now abandoned.

BACKGROUND AND SUMMARY

The invention relates to active adaptive control systems, and more particularly to an improvement incorporating coherence optimized filtering.

The invention arose during continuing development efforts directed toward active acoustic attenuation systems. Active acoustic attenuation involves injecting a canceling acoustic wave to destructively interfere with and cancel an input acoustic wave. In an active acoustic attenuation system, the input acoustic wave is sensed with an input transducer, such as a microphone or an accelerometer, which supplies an input reference signal to an adaptive filter control model. The output acoustic wave is sensed with an error transducer which supplies an error signal to the model. The model supplies a correction signal to a canceling output transducer, such as a loudspeaker or a shaker, which injects an acoustic wave to destructively interfere with the input acoustic wave and cancel or control same such that the output acoustic wave at the error transducer is zero or some other desired value.

An active adaptive control system minimizes the difference between a reference signal and a system output signal, such that the system will perform some desired task or function. A reference signal is generated by an input transducer or some alternative means for determining the desired system response. The system output signal is compared with the reference signal, e.g. by subtractive summing, providing an error signal. An adaptive filter model has a model input from the reference signal, an error input from the error signal, and outputs a correction signal to the output transducer to introduce a control signal to minimize the error signal.

The present invention is applicable to active adaptive control systems, including active acoustic attenuation systems. In the present invention, a coherence optimization method is provided wherein coherence in the system is determined, and a coherence filter is provided according to the determined coherence. In the preferred embodiment, coherence is determined with a second adaptive filter model, and at least one of the error signal, reference signal and correction signal is coherence filtered to substantially remove or de-emphasize the noncoherent portions. The coherence filtering may also shape the spectrum to assist the adaptive modeling. This maximizes model performance by concentrating model adaptation on the coherence portion of the signal which the model can cancel or control.

For example, in active noise control, the coherent portion of the error signal is due to the propagating sound wave sensed by the reference input microphone and then by the downstream error microphone. The noncoherent portion of the error signal is due to the background noise or random turbulence at the error microphone uncorrelated with background noise or random turbulence at the reference input microphone. The model cannot cancel such noncorrelated independent background noise or random turbulence at the separate locations of the reference input microphone and error microphone.

DETAILED DESCRIPTION

Figure 1:
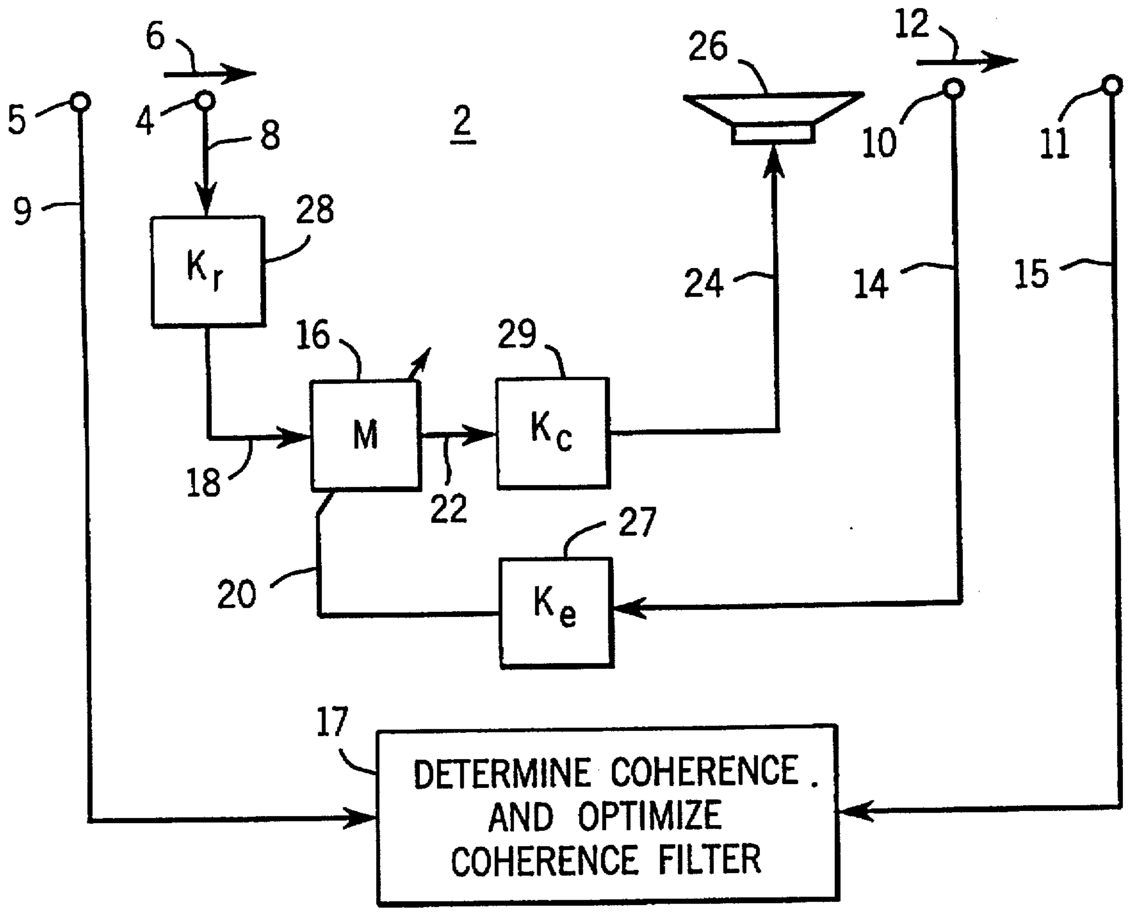
FIG. 1 is a schematic illustration of an active adaptive control system with coherence filtering in accordance with the invention.
Figure 5:
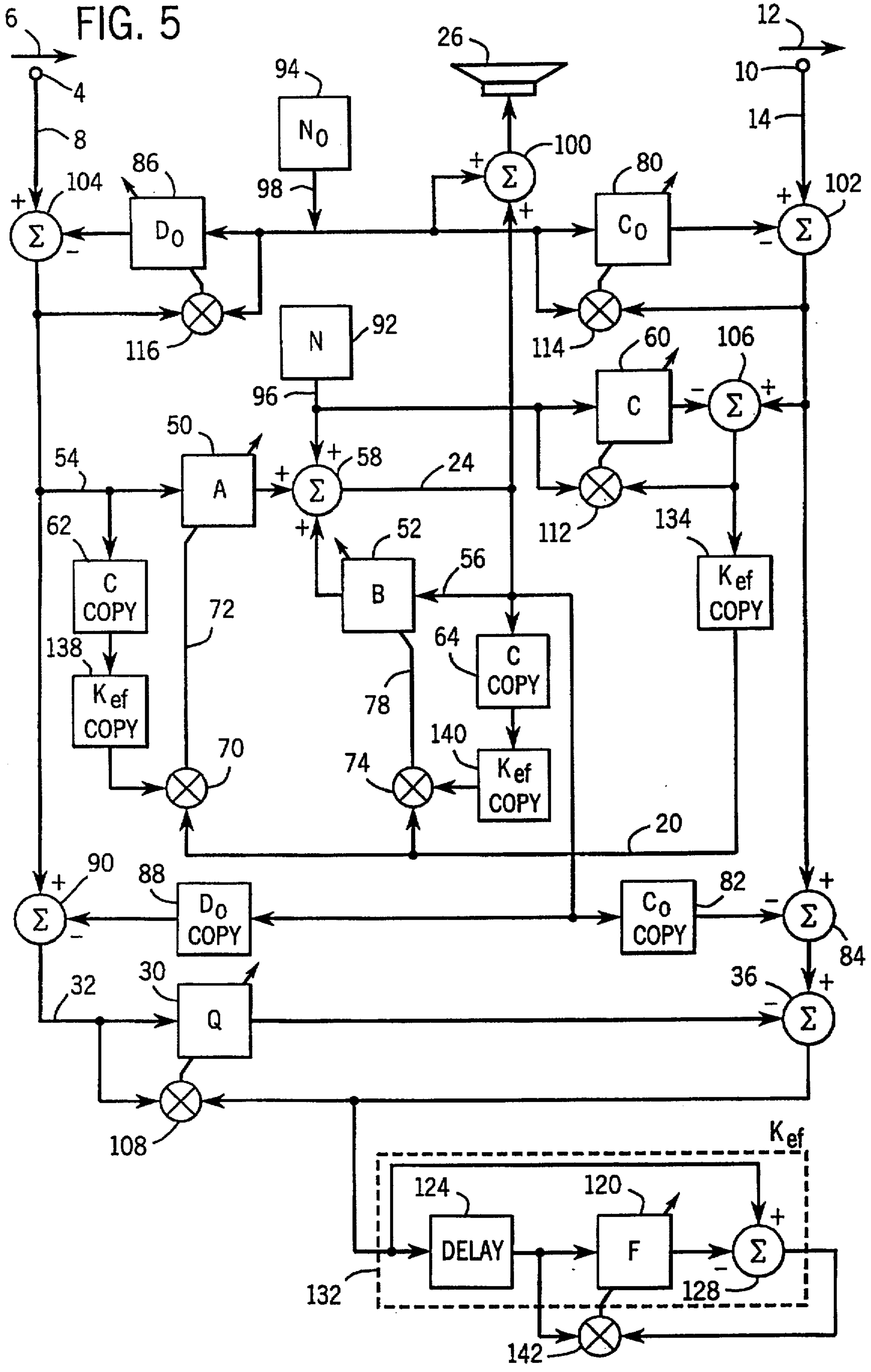
FIG. 5 is a further detailed schematic illustration of the system of FIG. 4 and includes a further alternative.

FIG. 1 shows a system similar to that shown in FIG. 5 of U.S. Pat. No. 4,677,676, incorporated herein by reference. FIG. 1 shows an active adaptive control system 2 including a reference input transducer 4, such as a microphone, accelerometer, or other sensor, sensing the system input signal 6 and outputting a reference signal 8. The system has an error transducer 10, such as a microphone, accelerometer, or other sensor, spaced from input transducer 4 and sensing the system output signal 12 and outputting an error signal 14. The system includes an adaptive filter model M at 16 which in the preferred embodiment is model 40 of U.S. Pat. No. 4,677,676, having a model input 18 from reference signal 8, an error input 20 from error signal 14, and a model output 22 outputting a correction signal 24 to an output transducer or actuator 26, such as a loudspeaker, shaker, or other actuator or controller, to introduce a control signal matching the system input signal, to minimize the error at error input 20.

Coherence optimization is afforded by providing first and second transducers outputting first and second signals, and determining coherence between the first and second signals, preferably with a second adaptive filter model at 17 modeling the transfer function between the first and second transducers and optimizing a determined coherence filter, to be described. The first and second transducers may be provided by transducers 5 and 11, as shown, providing respective first and second signals 9 and 15. Alternatively, reference input transducer 4 and error transducer 10 may be used as the first and second transducers, respectively, providing first and second signals 8 and 14, for determining at 17 the coherence between system input signal 6 and system output signal 12 which have coherent and noncoherent portions. A coherence filter is provided in the system according to the determined coherence. In the preferred embodiment, at least one of the error signal, reference signal and correction signal is coherence filtered, as shown at respective $K_e$ coherence filter 27, $K_r$ coherence filter 28, and $K_c$ coherence filter 29. Error signal 14 is coherence filtered by $K_e$ coherence filter 27 to emphasize the coherent portions thereof, to provide a coherence optimized filtered error signal. This maximizes model performance by de-emphasizing or eliminating portions of the error signal caused by system output signal portions which the model cannot cancel or control. Instead, model adaptation is concentrated to that portion which the model can cancel or control. Reference signal 8 is coherence filtered by $K_r$ coherence filter 28 to emphasize the coherent portions of the reference signal, and supply a coherence optimized reference signal to the model input 18. The correction signal is coherence filtered by $K_c$ coherence filter 29, to emphasize portions of the correction signal that correspond to coherent portions of the system input and output signals.

Figure 2:
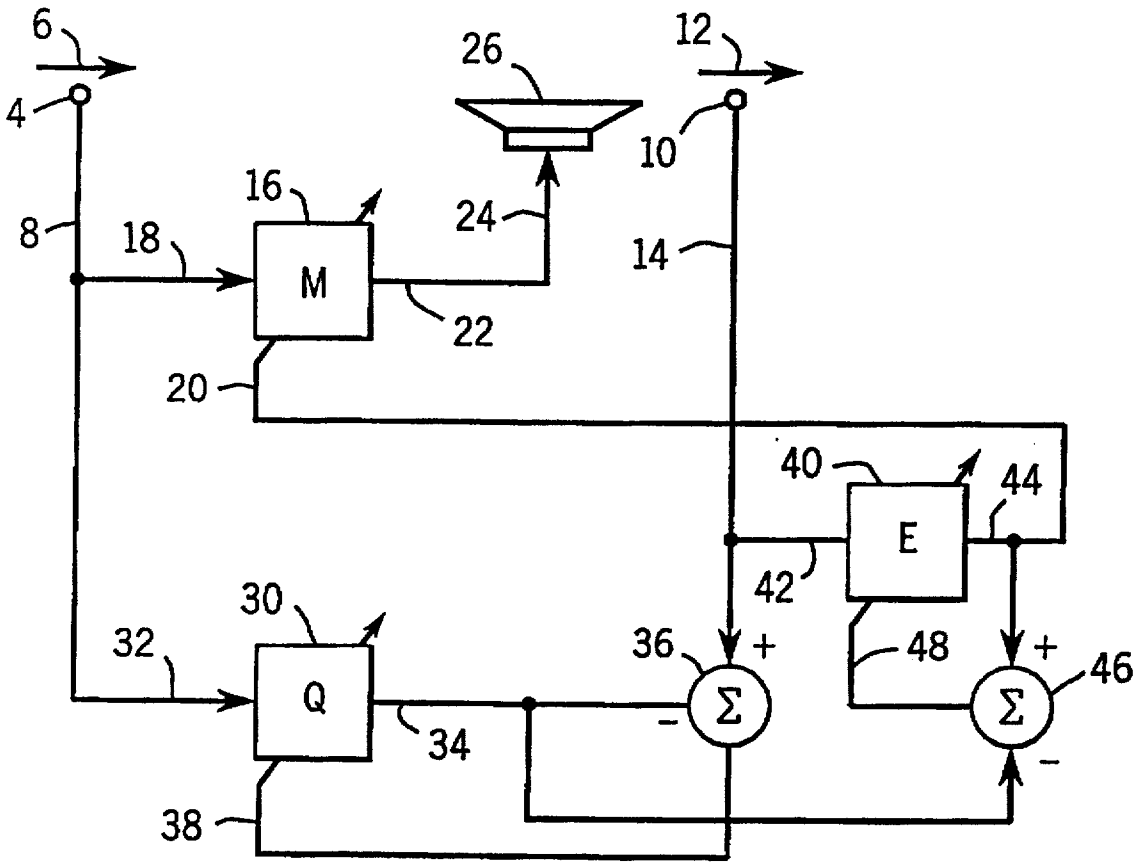
FIG. 2 schematically illustrates one implementation of a portion of the system of FIG. 1.

FIG. 2 shows one implementation of a portion of the system of FIG. 1, and uses like reference numerals from FIG. 1 where appropriate to facilitate understanding. A second adaptive filter model Q at 30 has a model input 32 from reference signal 8, a model output 34 subtractively summed at summer 36 with error signal 14 from error transducer 10, and an error input 38 from the output of summer 36. A third adaptive filter model E at 40 has a model input 42 from error signal 14, a model output 44 subtractively summed at summer 46 with the model output 34 of Q model 30, and an error input 48 from the output of summer 46. The model output 44 of E model 40 provides a coherence optimized filtered error signal. The output 34 of Q model 30 approaches the coherent portion of error signal 14, i.e. that portion of system output signal 12 which is correlated to system input signal 6. E model 40 attempts to drive its error input 48 towards zero, which in turn requires that the output of summer 46 be minimized, which in turn requires that each of the inputs to summer 46 be substantially the same, which in turn requires that E model output 44 be driven toward the value of Q model output 34, whereby E model 40 coherence filters error signal 14 to substantially remove portions thereof which are noncoherent with system input signal 6, and passing coherent portions to E model output 44. The coherence filter E at 40 in FIG. 2 provides the $K_e$ filter 27 in FIG. 1. Alternatively, $K_e$ filter 27 of FIG. 1 may be provided by a copy of E filter 40 of FIG. 2, for example as shown at 107, FIG. 3, to be described.

In one embodiment, Q model 30 and E model 40 are pre-trained off-line prior to active adaptive control by M model 16, and E model 40 is then fixed to provide coherence filtering of error signal 14 during on-line operation of M model 16. In another embodiment, models 30 and 40 are adapted during on-line active adaptive control by model 16, to be described in conjunction with FIG. 3.

Figure 3:
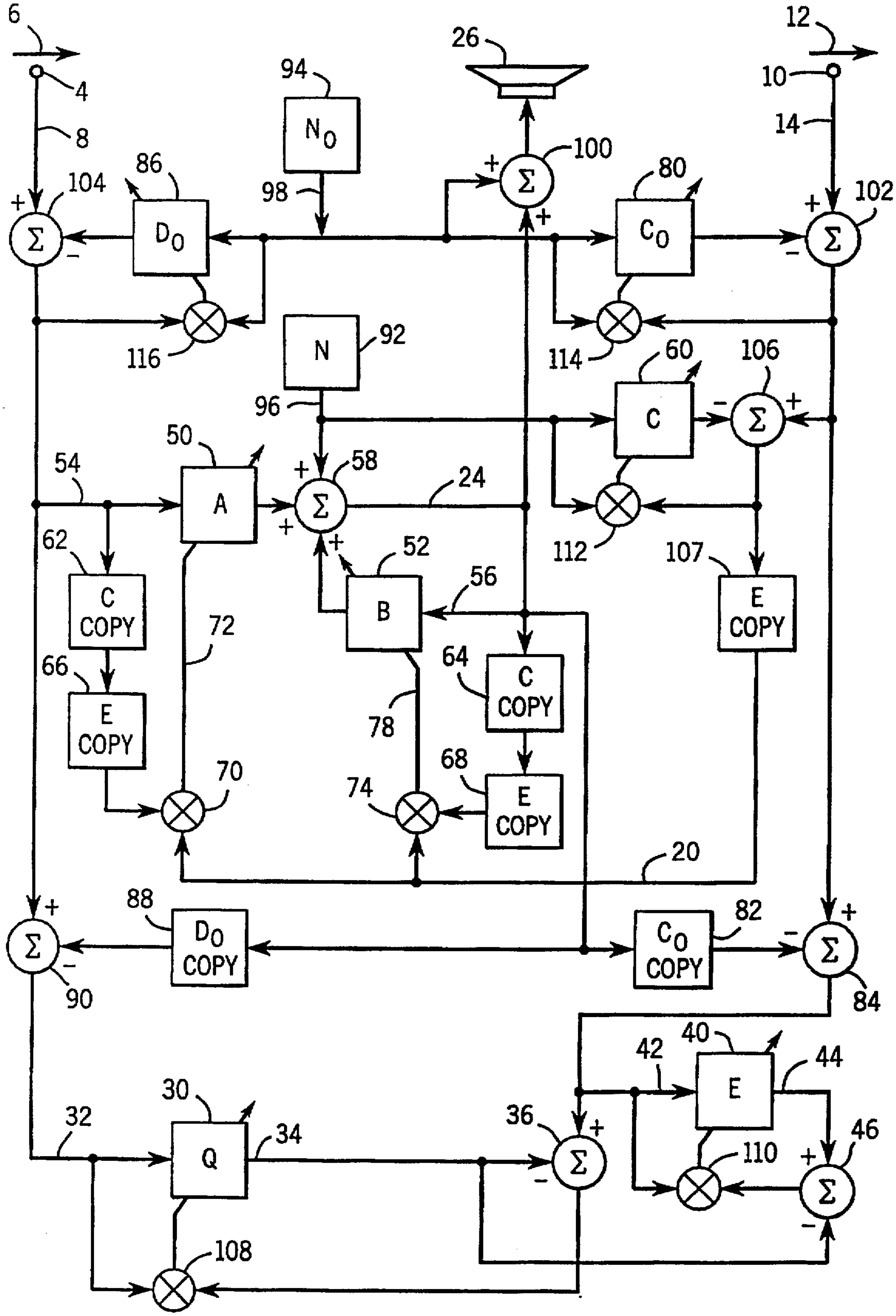
FIG. 3 is a further detailed schematic illustration of the system of FIG. 2 and includes a further alternative.

FIG. 3 uses like reference numerals from FIGS. 1 and 2 where appropriate to facilitate understanding. Model 16, FIG. 2, is preferably an IIR (infinite impulse response) filter provided by an RLMS (recursive least mean square) filter, as in U.S. Pat. No. 4,677,676, and includes a first algorithm filter, preferably an FIR (finite impulse response) filter provided by an LMS (least mean square) filter shown as filter A at 50, FIG. 3, and a second algorithm filter, preferably an FIR filter provided by an LMS algorithm filter, shown as filter B at 52. Filter 50 has a filter input 54 from reference signal 8. Filter 52 has a filter input 56 from correction signal 24. Summer 58 has an input from A filter 50 and an input from B filter 52 and provides an output resultant sum as correction signal 24. Adaptive filter model C at 60, preferably an RLMS IIR filter as in U.S. Pat. No. 4,677,676 at 142, models the transfer function from the outputs of the A and B filters to the error transducer. A copy of C model 60 is provided at 62, and another copy of C model 60 is provided at 64. A copy of E model 40 is provided at 66, and another copy of E model 40 is provided at 68. Copies 62 and 66 are connected in series. Copies 64 and 68 are connected in series. The series connection of C copy 62 and E copy 66 has an input from the input 54 to A filter 50, and has an output to multiplier 70. Multiplier 70 multiplies the output of the series connection of C copy 62 and E copy 66 and the error signal at error input 20, and supplies the resultant product as a weight update signal 72 to A filter 50. As noted in U.S. Pat. No. 4,677,676, in some prior art references, the multiplier such as 70 is explicitly shown, as in FIG. 3, and in others the multiplier or other combination of reference and error signals is inherent or implied in the controller model such as 16 and hence the multiplier or combiner may be deleted in various references and such is noted for clarity. For example, FIG. 2 shows the deletion of such multiplier or combiner 70, and such function if necessary, is implied in controller 16, as understood in the art. The series connection of C copy 64 and E copy 68 has an input from the input 56 to B filter 52, and has an output to multiplier 74. Multiplier 74 multiplies the output of the series connection of C copy 64 and E copy 68 and the error signal at error input 20, and supplies the resultant product as a weight update signal 78 to B filter 52.

Adaptive filter $C_0$ model 80 models the transfer function from output transducer 26 to error transducer 10. Copy 82 of model 80 has an input from correction signal 24 and an output subtractively summed at summer 84 with the error signal. The output of summer 84 is supplied to summer 36 and to model input 42 of E model 40. Adaptive filter $D_0$ model 86 models the transfer function from output transducer 26 to reference input transducer 4. Copy 88 of model 86 has an input from correction signal 24 and an output subtractively summed at summer 90 with the reference signal. Model reference input 32 of Q model 30 receives the output of summer 90.

First and second auxiliary random noise sources 92 and 94, preferably each provided by a random noise source such as 140 in incorporated U.S. Pat. No. 4,677,676, supply respective auxiliary random noise source signals 96 and 98. Auxiliary random noise source signal 96 is supplied to summer 58 and to the input of C model 60. Auxiliary random noise source signal 98 is provided to the input of $C_0$ model 80 and to the input of $D_0$ model 86 and to summer 100 additively summing the output of summer 58 and auxiliary random noise source signal 98, and supplying the resultant sum to output transducer 26. Summer 102 subtractively sums the output of error transducer 10 and the output of $C_0$ model 80, and supplies the resultant sum to summer 84. Summer 104 subtractively sums the output of reference input transducer 4 and the output of $D_0$ model 86, and supplies the resultant sum to summer 90. Summer 106 subtractively sums the output of summer 102 and the output of C model 60, and supplies the resultant sum through E copy 107 to error input 20. E copy 107 removes the noncoherent portion of the error signal. Multipliers 108, 110, 112, 114, 116 multiply the respective model reference and error inputs of respective models 30, 40, 60, 80, 86, and supply the output resultant product as the respective weight update signal for that model. In the preferred embodiment, models 30, 40, 60, 80 and 86 adapt during on-line active adaptive control by A filter 50 and B filter 52 providing M model 16. Further in the preferred embodiment, models 60, 80 and 86 are pre-trained off-line prior to active adaptive control by M model 16, and models 60, 80 and 86 remain adaptive and continue to adapt during on-line adaptive operation of models 16, 30 and 40.

Figure 4:
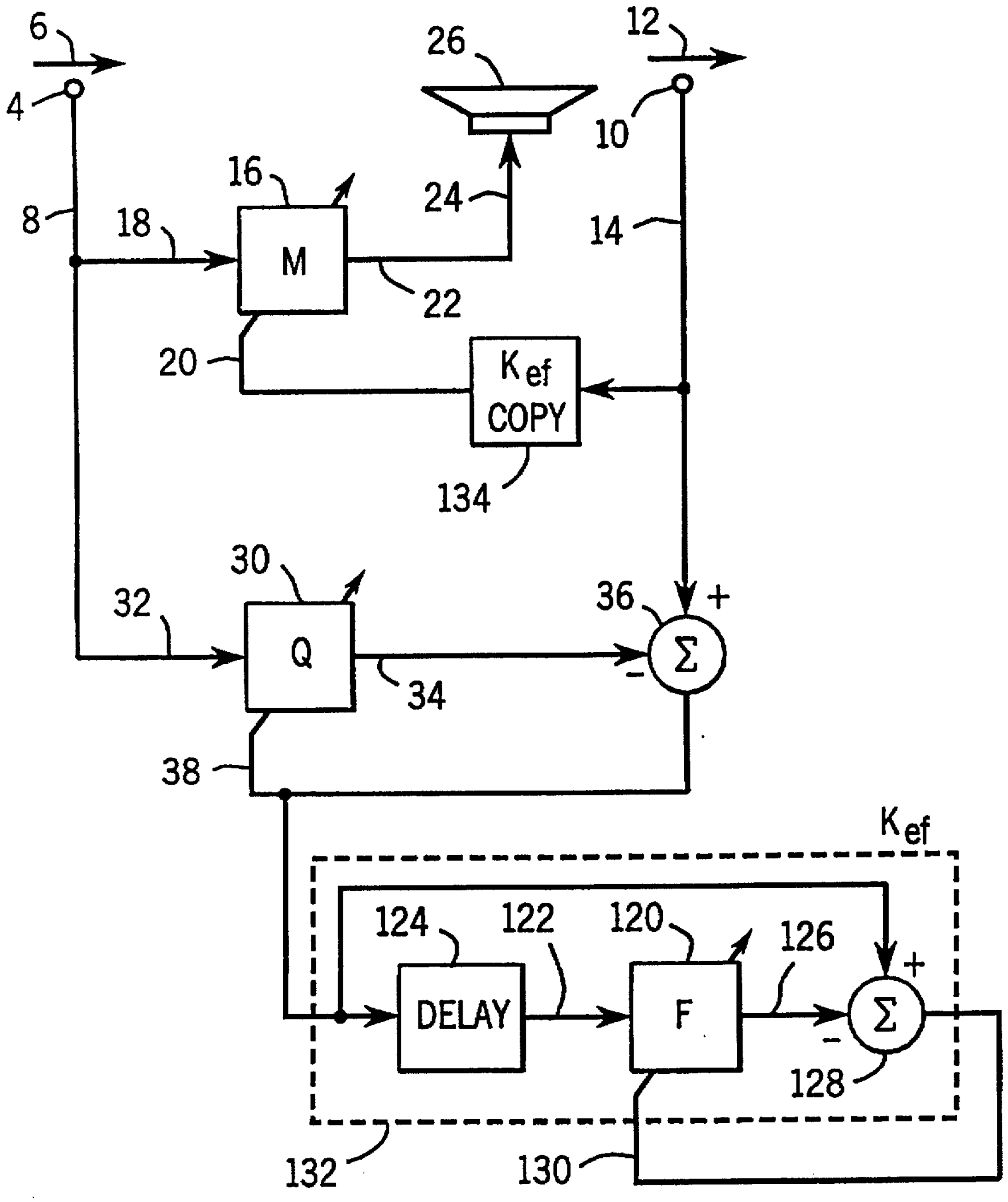
FIG. 4 schematically illustrates another implementation of a portion of the system of FIG. 1.

FIG. 4 uses like reference numerals from above where appropriate to facilitate understanding. Adaptive filter F model 120 has a model input 122 supplied from the output of summer 36 through delay 124, a model output 126 subtractively summed at summer 128 with the output of summer 36, and an error input 130 from the output of summer 128. The combination shown in dashed line at 132 in FIG. 4 provides a $K_{ef}$ filter which may be used as the $K_e$ filter 27 in FIG. 1. Alternatively, $K_e$ filter 27 may be provided by a copy 134 of the $K_{ef}$ filter, FIGS. 4 and 5, to be described. The coherence optimization system of FIG. 4 flattens or whitens or normalizes the canceled error spectrum. This shaping of the spectrum enhances cancellation and convergence speed. The system emphasizes the coherent information while whitening or normalizing the noncoherent information, allowing the LMS algorithm, which is a whitening process, to quickly adapt to the required solution to cancel the coherent information. During perfect cancellation, the error signal contains only noncoherent information but this information is still passed through the coherence filter to the adaptive algorithm in a whitened form.

The electronically canceled error signal from summer 36 is modeled by predictive F filter 120. This is a moving average filter that attempts to predict the next value of the electronically canceled error signal based on the past values of such signal. Delay 124 preceding F filter 120 forces F to predict, since F does not have access to the current value. F filter 120 models the spectrum of the error signal through delay 124. When the output of F filter 120 is summed at 128 with the electronically canceled error signal, the resulting error signal 130 represents the optimally filtered canceled error signal. This resulting signal contains only noncoherent information and has a white spectrum due to predictive F filter 120. Combination 132 provides a coherence optimized error filter. In FIG. 4, $K_{ef}$ copy 134 filters error signal 14 from error transducer 10, and such filtered error signal has peaks in the frequency domain which are proportional to the coherence and not to the magnitude of original error signal 14. The filtered error signal from $K_{ef}$ copy 134 provides the error signal to error input 20 of M model 16. By using such filtered error signal at 20, the update process of M model 16 is weighted in the frequencies of maximum coherence. Hence, final cancellation obtained will be based on the available coherence, as opposed to spectral energy of the measured error signal.

The output of $K_{ef}$ copy 134 provides a coherence optimized filtered error signal to error input 20 of M model 16. The output of summer 36 approximates the noncoherent portion of the error signal, i.e. the portion of the system output signal 12 appearing at error transducer 10 that has no coherence with any portion of the system input signal 6 appearing at input transducer 4, which in turn is modeled and approximated by prediction F filter 120. Delay 124 and F filter 120 provide a forward predictor, and hence the output of summer 128 approaches a white signal representing the coherence filtered version of the noncoherent portion of the error signal, i.e. filtered version of the output of summer 36. The purpose of whitening the noncoherent portion of the error signal is to emphasize the coherent portion, since the coherence filtered error signal at error input 20 will now have peaks in the spectrum which are proportional to the coherence and not to the original error signal spectral magnitude. This ensures that when using the LMS adaptive algorithm to adapt model M, final attenuation obtained will be based on available coherence, and not on the spectral energy of the measured error signal.

In one embodiment, Q model 30 and F model 120 are pre-trained off-line prior to active adaptive control by M model 16, and a fixed $K_{ef}$ copy 134 is provided. In another embodiment, Q model 30 and F model 120 are adapted during on-line active adaptive control by M model 16, to be described in conjunction with FIG. 5.

FIG. 5 uses like reference numerals from above where appropriate to facilitate understanding. Model 16 of FIG. 4 is an RLMS IIR filter provided by an LMS FIR filter A at 50 having a filter input 54 from the reference signal, and an LMS FIR filter B at 52 having a filter input 56 from the correction signal. Summer 58 has an input from A filter 50 and an input from B filter 52 and provides an output resultant sum as correction signal 24. Adaptive filter C model 60 models the transfer function from the outputs of the A and B filters to the error transducer. Copies of C model 60 are provided at 62 and 64. Copies of the $K_{ef}$ coherence filter 132 are provided at 138 and 140. C copy 62 and $K_{ef}$ copy 138 are connected in series and have an input from the input 54 to A filter 50. Multiplier 70 multiplies the output of the series connection of C copy 62 and $K_{ef}$ copy 138 and the output of $K_{ef}$ copy 134, and supplies the resultant product as weight update signal 72 to A filter 50. C copy 64 and $K_{ef}$ copy 140 are connected in series and have an input from the input 56 to B filter 52. Multiplier 74 multiplies the output of series connected C copy 64 and $K_{ef}$ copy 140 and the output of $K_{ef}$ copy 134, and supplies the resultant product as weight update signal 78 to B filter 52. Adaptive filter $C_0$ model 80 models the transfer function from output transducer 26 to error transducer 10. Copy 82 of $C_0$ model 80 has an input from the correction signal and an output subtractively summed at summer 84 with the error signal. Summer 36 receives the output of summer 84. Adaptive filter $D_0$ model 86 models the transfer function from output transducer 26 to reference input transducer 4. Copy 88 of $D_0$ model 86 has an input from the correction signal and an output subtractively summed at summer 90 with the reference signal. Model input 32 of Q model 30 receives the output of summer 90.

First auxiliary random noise source 92 supplies first auxiliary random noise source signal 96 to summer 58 and to the input of C model 60. Second auxiliary random noise source 94 supplies second auxiliary random noise source signal 98 to the input of $C_0$ model 80 and to the input of $D_0$ model 86 and to summer 100. Summer 100 additively sums the output of summer 58 and auxiliary random noise source signal 98, and supplies the resultant sum to output transducer 26. Summer 102 subtractively sums the output of error transducer 10 and the output of $C_0$ model 80, and supplies the resultant sum to summer 84. Summer 104 subtractively sums the output of reference input transducer 4 and the output of $D_0$ model 86, and supplies the resultant sum to summer 90. Summer 106 subtractively sums the output of summer 102 and the output of C model 60, and supplies the resultant sum to the input of $K_{ef}$ copy 134. Multipliers 108, 142, 112, 114, 116 multiply the respective model reference and error inputs of respective models 30, 120, 60, 80, 86, and provide the respective resultant product as a weight update signal to that respective model. In the preferred embodiment, models 30, 120, 60, 80 and 86 adapt during on-line active adaptive control by A filter 50 and B filter 52 providing M model 16. Further in the preferred embodiment, models 60, 80 and 86 are pre-trained off-line prior to active adaptive control by M model 16, and models 60, 80 and 86 remain adaptive and continue to adapt during adaptive on-line operation of models 16, 30 and 120.

Figure 6:
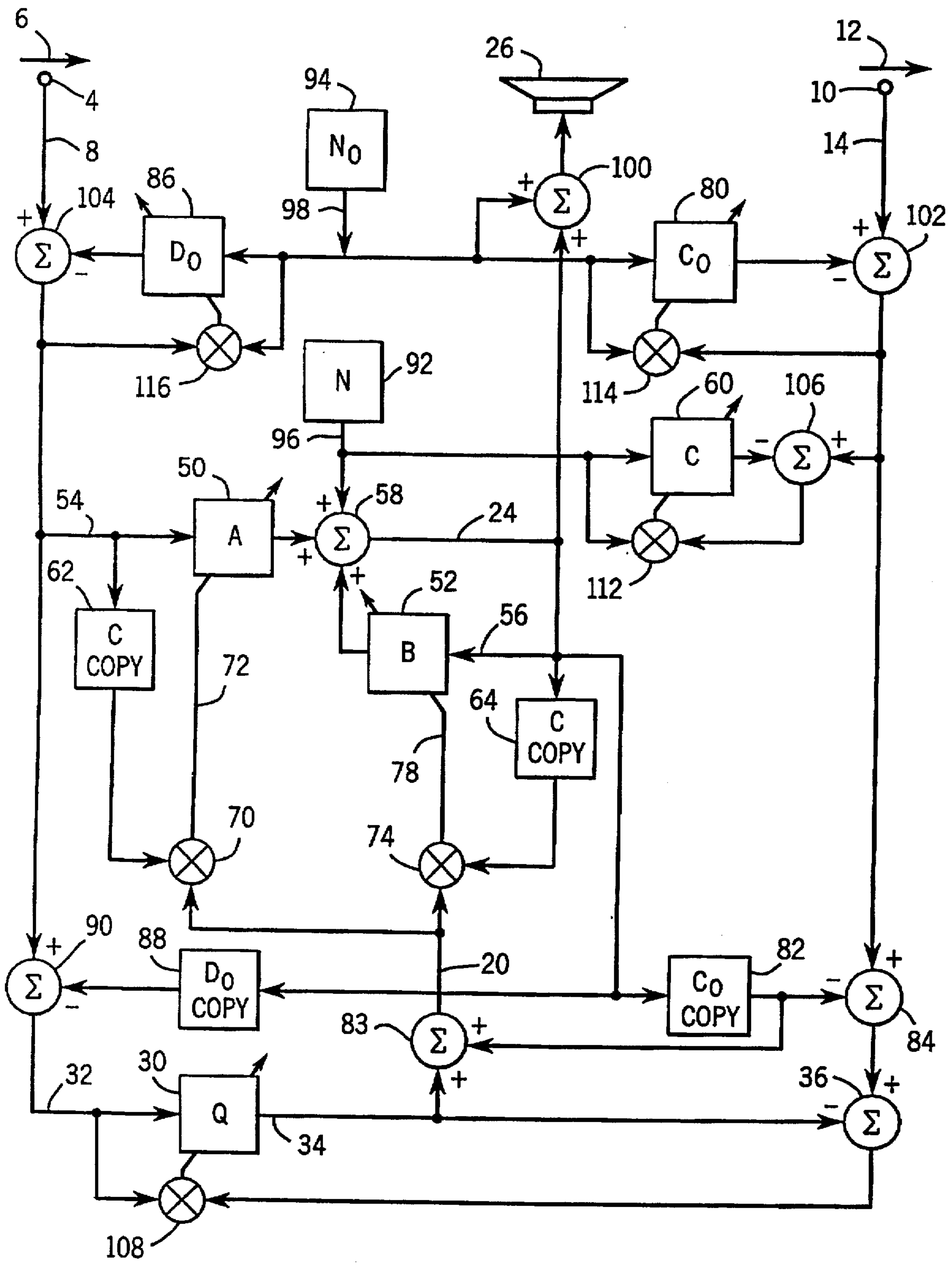
FIG. 6 is a further detailed schematic illustration of a portion of the system of FIG. 1 and includes a further alternative.

FIG. 6 uses like reference numerals from above where appropriate to facilitate understanding. In FIG. 6, output 34 of Q model 30 is supplied as a coherence optimized filtered error signal to error input 20 of M model 16. Q model 30 models the coherent portion of the system input signal 6 appearing in the system output signal 12 at error transducer 10, i.e. Q model 30 models what it can, namely the correlated portion of the system input signal. M model 16 is provided by a first LMS FIR adaptive filter A at 50 having a filter input 54 from the reference signal, and a second LMS FIR adaptive filter B at 52 having a filter input 56 from the correction signal. Summer 58 has an input from A filter 50 and an input from B filter 52, and provides the output resultant sum as correction signal 24. Adaptive filter C model 60 models the transfer function from the outputs of the A and B filters to the error transducer. C copy 62 has an input from the input 54 to A filter 50. Multiplier 70 multiplies the output of C copy 62 and a coherence filtered error signal at error input 20 provided through summer 83 from the output 34 of Q model 30, and supplies the resultant product as weight update signal 72 to A filter 50. Copy 64 of C model 60 has an input from the input 56 to B filter 52. Multiplier 74 multiplies the output of C copy 64 and the coherence filtered error signal at error input 20, and supplies the resultant product as weight update signal 78 to B filter 52. Adaptive $C_0$ model 80 models the transfer function from output transducer 26 to error transducer 10. Copy 82 of $C_0$ model 80 has an input from the correction signal and an output subtractively summed at summer 84 with the error signal, and additively summed at summer 83 with output 34 of Q model 30. Summer 36 receives the output of summer 84. Adaptive filter $D_0$ model 86 models the transfer function from output transducer 26 to reference input transducer 4. Copy 88 of $D_0$ model 86 has an input from the correction signal and an output subtractively summed at summer 90 with the reference signal. Model input 32 of Q model 30 receives the output of summer 90. Auxiliary random noise source 92 supplies auxiliary random noise source signal 96 to summer 58 and to the input of C model 60. Auxiliary random noise source 94 supplies auxiliary random noise source signal 98 to the input of $C_0$ model 80 and to the input of $D_0$ model 86 and to summer 100. Summer 100 sums the output of summer 58 and auxiliary random noise source signal 98, and supplies the resultant sum to output transducer 26. Summer 102 subtractively sums the output of error transducer 10 and the output of $C_0$ model 80, and supplies the resultant sum to summer 84. Summer 104 subtractively sums the output of input transducer 4 and the output of $D_0$ model 86, and supplies the resultant sum to summer 90. In the preferred embodiment, models 30, 60, 80 and 86 adapt during on-line active adaptive control by A filter 50 and B filter 52 providing M model 16. Further in the preferred embodiment, models 60, 80 and 86 are pre-trained off-line prior to active adaptive control by M model 16, and models 60, 80 and 86 remain adaptive and continue to adapt during on-line adaptive operation of models 16 and 30.

Figure 7:
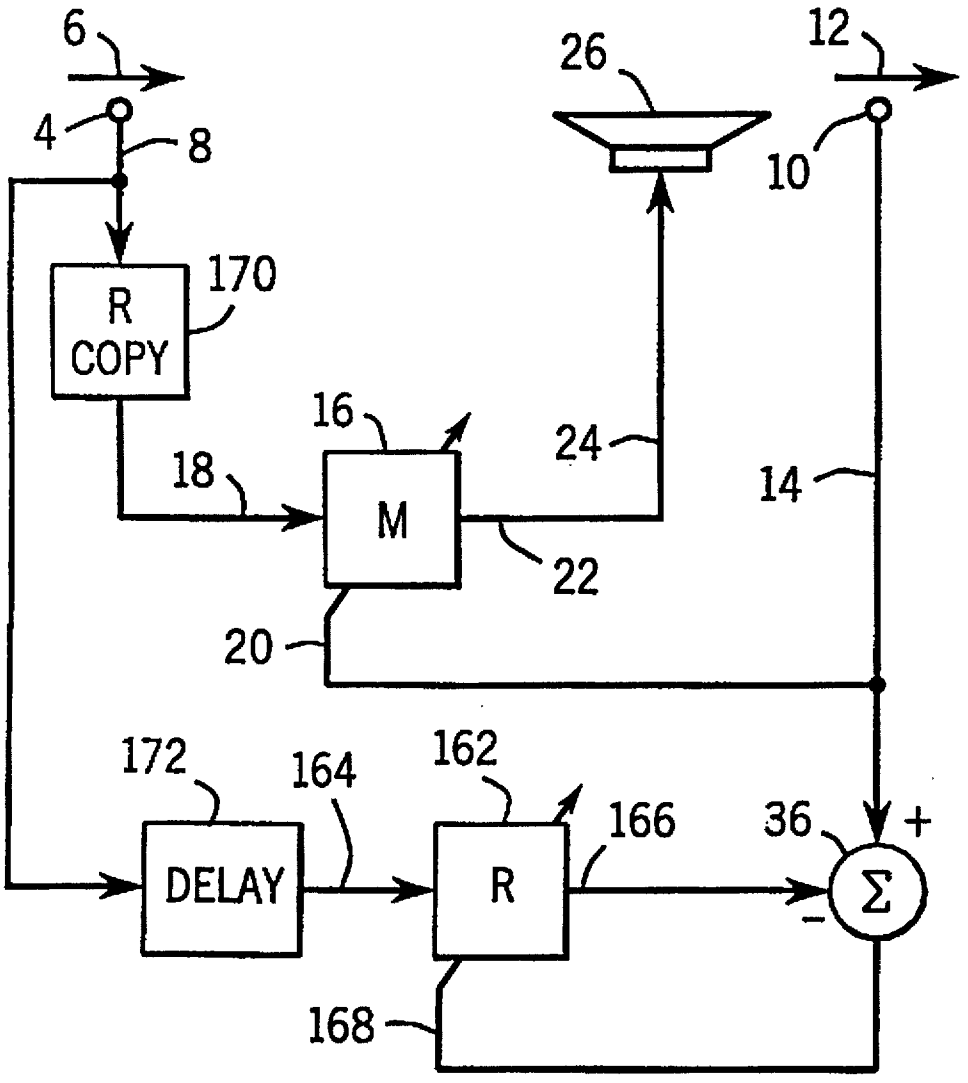
FIG. 7 schematically illustrates another implementation of a portion of the system of FIG. 1.

FIG. 7 uses like reference numerals from above where appropriate to facilitate understanding. Adaptive filter R model 162 has a model input 164 from the reference signal, a model output 166 subtractively summed at summer 36 with the error signal 14 from error transducer 10, and an error input 168 from the output of summer 36. A copy 170 of R model 162 is provided at model input 18 of M model 16, and reference signal 8 is supplied through R copy 170 to input 18 of M model 16. Delay 172 is provided at model input 164 of R model 162 to match the propagation delay of system input signal 6 to the error transducer 10. R model 162 removes the portion of the reference signal that is not coherent. As R model 162 adapts, it models the transfer function from the input or reference transducer 4 to the error transducer 10 where the coherence is good. Where the coherence is poor, R model 162 will tend to reject the signal, like the operation of Q model 30, FIGS. 2–6. Since R model 162 is modeling a transfer function, it shapes the signal that it is filtering in areas where the coherence is good. R model 162 shapes coherent information, and removes noncoherent information. The R copy at 170 in FIG. 7 provides $K_r$ filter 28 of FIG. 1. Reference signal 8 is coherence filtered by the $K_r$ coherence filter to remove noncoherent portions from reference signal 8, and supply only the coherent portion of reference signal 8 to model input 18.

In one embodiment, R model 162 is pre-trained off-line prior to active adaptive control by M model 16, and R copy 170 is fixed during on-line operation of M model 16. In another embodiment, the reference signal is coherence filtered with an adaptive filter model during on-line operation of M model 16, to be described in conjunction with FIG. 8.

E model 40 providing $K_e$ coherence filter passes coherent information without shaping, and removes noncoherent information. F model 120 providing the $K_{ef}$ coherence filter shapes coherent and noncoherent information for optimal cancellation by whitening the noncoherent spectrum, and does not remove noncoherent information. R model 162 providing the $K_r$ coherence filter shapes coherent information and removes noncoherent information.

Figure 8:
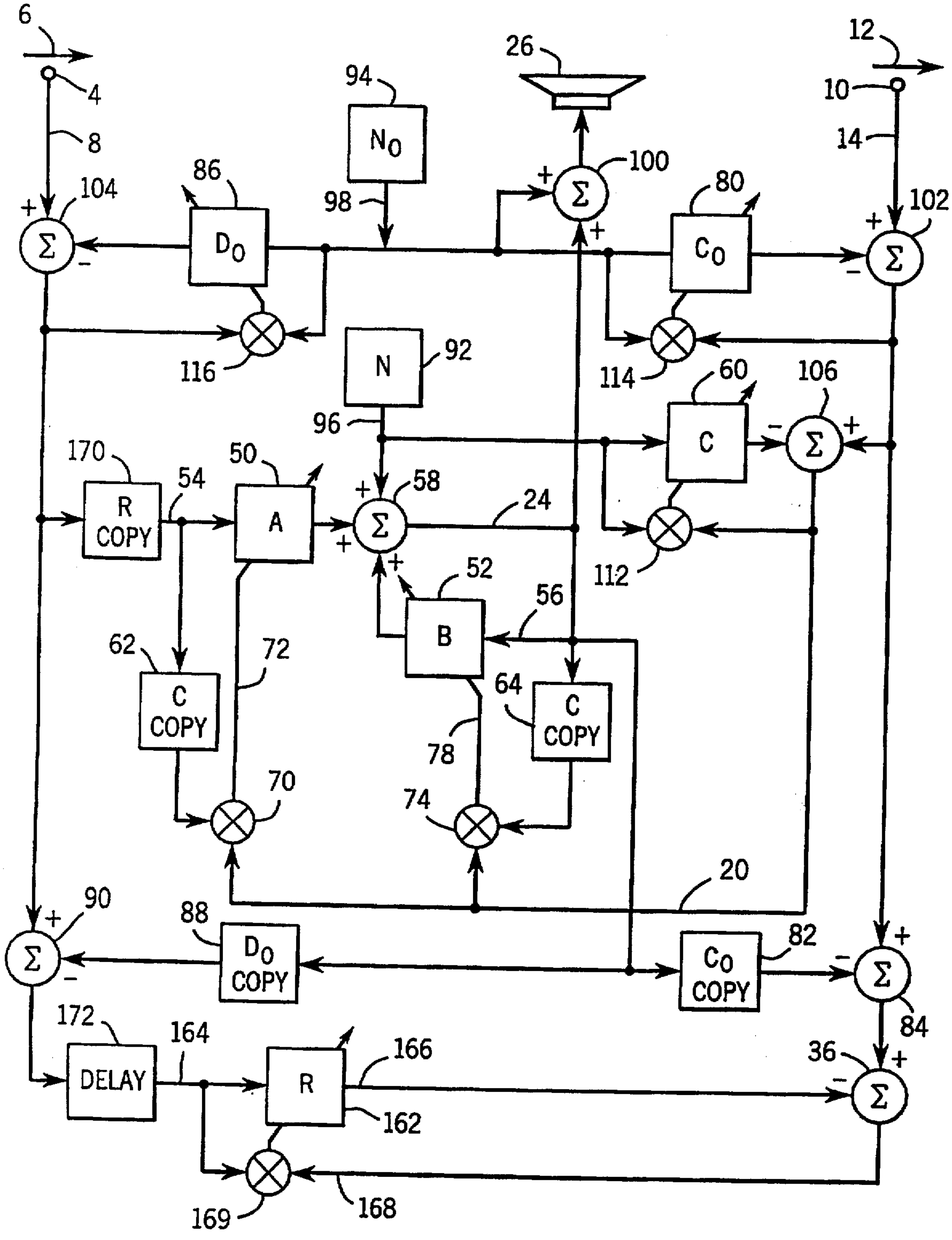
FIG. 8 is a further detailed schematic illustration of the system of FIG. 7 and includes a further alternative.

FIG. 8 uses like reference numerals from above where appropriate to facilitate understanding. M model 16 is provided by a first LMS FIR adaptive filter A at 50 having a filter input 54 through R copy 170 from the reference signal, and a second LMS FIR adaptive filter B at 52 having a filter input 56 from the correction signal. Summer 58 has an input from A filter 50 and an input from B filter 52, and provides the output resultant sum as correction signal 24. Adaptive filter C model 60 models the transfer function from the outputs of the A and B filters to the error transducer. A first copy 62 of C model 60 has an input from input 54 to A filter 50. Multiplier 70 multiplies the output of C copy 62 and the error signal at error input 20, and supplies the resultant product as weight update signal 72 to A filter 50. A second copy 64 of C model 60 has an input from input 56 to B filter 52. Multiplier 74 multiplies the output of C copy 64 and the error signal at error input 20, and supplies the resultant product as weight update signal 78 to B filter 52. Adaptive filter $C_0$ model 80 models the transfer function from output transducer 26 to error transducer 10. Copy 82 of $C_0$ model 80 has an input from the correction signal and an output subtractively summed at summer 84 with the error signal. Summer 36 receives the output of summer 84. Adaptive filter $D_0$ model 86 models the transfer function from output transducer reference input transducer 4. Copy 88 of $D_0$ model 86 has an input from the correction signal and an output subtractively summed at summer 90 with the reference signal. Model input 164 of R model 162 receives the output of summer 90 through delay 172. Auxiliary random noise source 92 supplies auxiliary random noise source signal 96 to summer 58 and to the input of C model 60. Auxiliary random noise source 94 supplies auxiliary random noise source signal 98 to the input of $C_0$ model 80 and to the input of $D_0$ model 86 and to summer 100. Summer 100 additively sums the output of summer 58 and the auxiliary random noise source signal 98, and supplies the resultant sum to output transducer 26. Summer 102 subtractively sums the output of error transducer 10 and the output of $C_0$ model 80, and supplies the resultant sum to summer 84.

Summer 104 subtractively sums the output of reference input transducer 4 and the output of $D_0$ model 86, and supplies the resultant sum to summer 90 and to R copy 170. Summer 106 subtractively sums the output of summer 102 and the output of C model 60, and supplies the resultant sum to error input 20. Multipliers 112, 114, 116, 169 multiply the respective reference and error inputs of respective models 60, 80, 86, 162, and provide the respective resultant product as a weight update signal to that respective model. In the preferred embodiment, models 162, 60, 80 and 86 adapt during on-line active adaptive control by A filter 50 and B filter 52 providing M model 16. Further in the preferred embodiment, models 60, 80 and 86 are pre-trained off-line prior to active adaptive control by M model 16, and models 60, 80 and 86 remain adaptive and continue to adapt during adaptive on-line operation of models 16 and 162.

Figure 9:
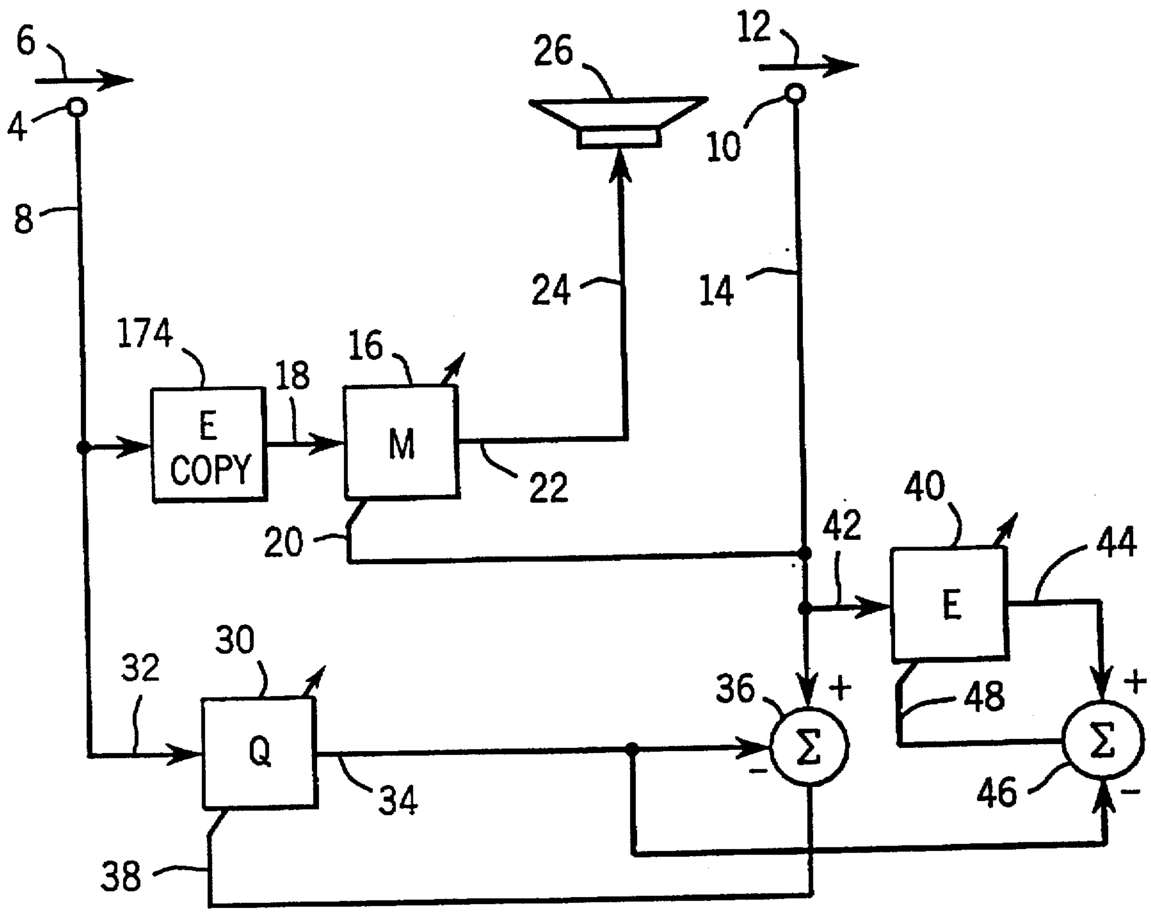
FIG. 9 schematically illustrates another implementation of a portion of the system of FIG. 1.

FIG. 9 uses like reference numerals from above where appropriate to facilitate understanding. Reference signal 8 is coherence filtered by a copy 174 of E filter 40 having an input from input transducer 4 and an output to model input 18 of M model 16. The error signal to error input 20 of M model 16 may be provided directly from error transducer 10, as shown, or alternatively the error signal may also be coherence filtered through a copy of E model 40 or by supplying the output 44 of E model 40 as the error signal to error input 20.

Figure 10:
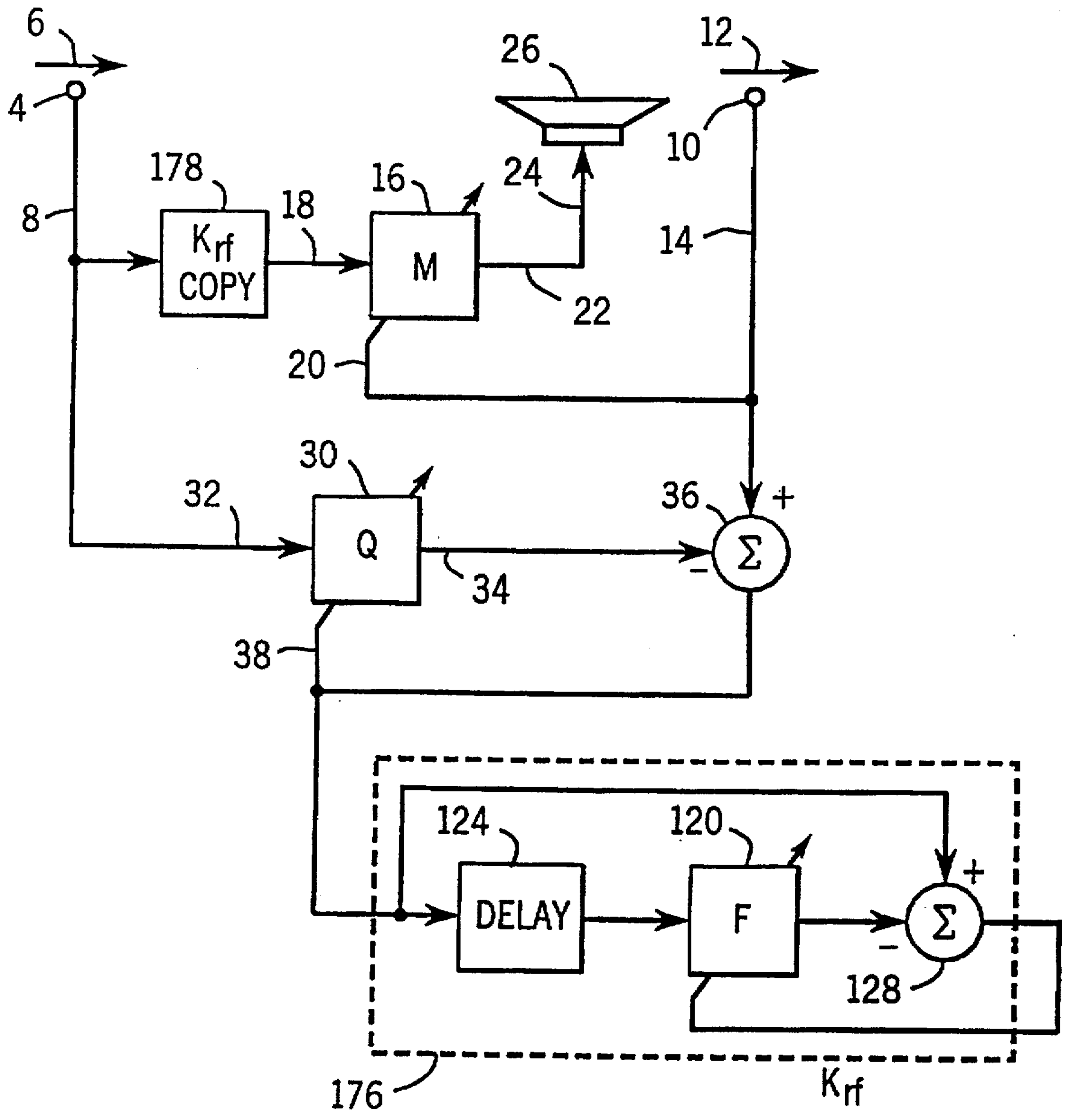
FIG. 10 schematically illustrates another implementation of a portion of the system of FIG. 1.

FIG. 10 uses like reference numerals from above where appropriate to facilitate understanding. The combination shown in dashed line provides a $K_{rf}$ coherence filter 176, like $K_{ef}$ coherence filter 132 in FIG. 4. $K_{rf}$ coherence filter 176 provides the noted $K_r$ filter 28 in FIG. 1. Reference signal 8 is coherence filtered by $K_{rf}$ coherence filter 176, or alternatively by a copy thereof as shown at 178 in FIG. 10. Reference signal 8 is coherence filtered by coherence filter 178 before supplying same to model input 18 of M model 16. The model input 18 is thereby coherence filtered to emphasize the coherent portions of reference signal 8 from input transducer 4.

Figure 11:
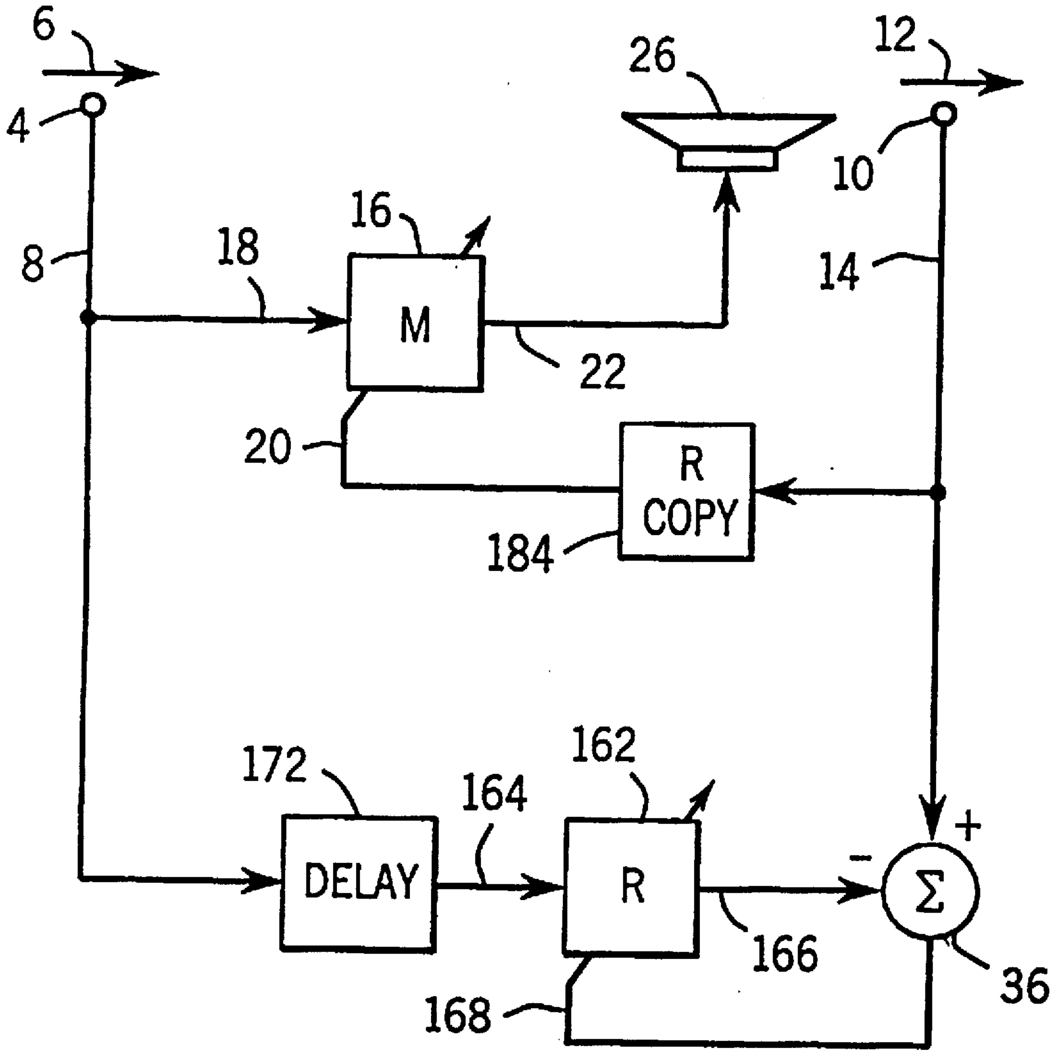
FIG. 11 schematically illustrates another implementation of a portion of the system of FIG. 1.

FIG. 11 uses like reference numerals from above where appropriate to facilitate understanding. In FIG. 11, the error signal supplied to error input 20 of M model 16 is coherence filtered by a coherence filter $K_e$ provided by a copy 184 of R model 162, FIG. 7, passing the coherent portion of the error signal.

Figure 12:
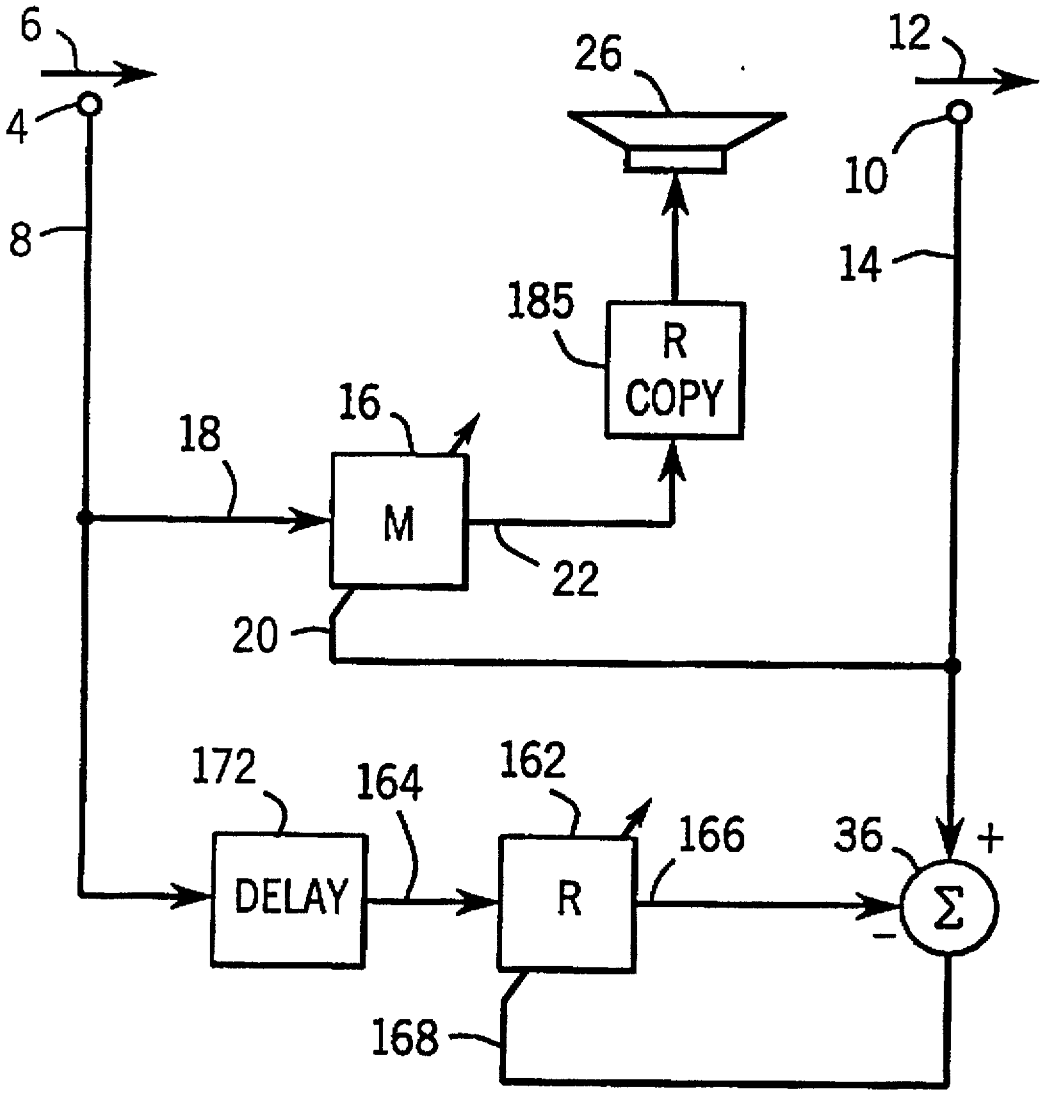
FIG. 12 schematically illustrates another implementation of a portion of the system of FIG. 1.

FIG. 12 uses like reference numerals from above where appropriate to facilitate understanding. In FIG. 12, the correction signal from the output 22 of M model 16 is coherence filtered by a coherence filter $K_c$ provided by a copy 185 of R model 162, FIG. 7, passing the coherent portion of the correction signal.

Figure 13:
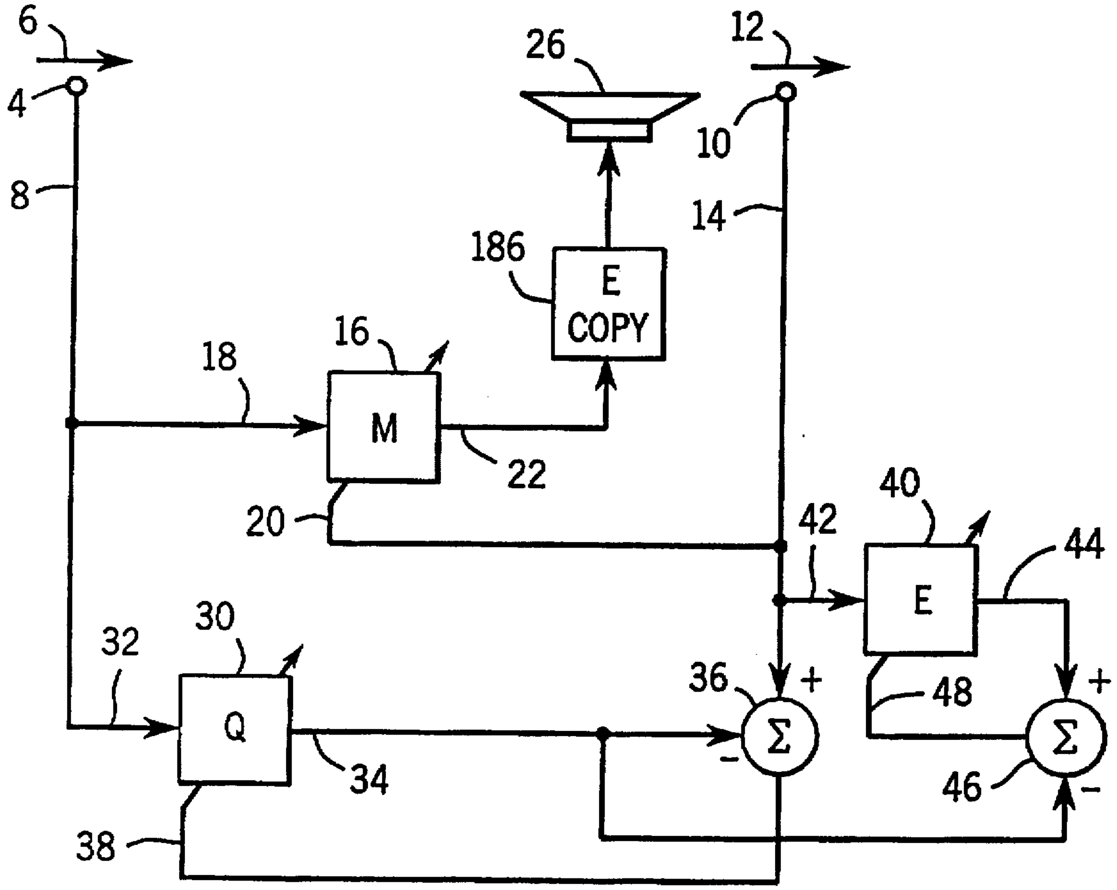
FIG. 13 schematically illustrates another implementation of a portion of the system of FIG. 1.

FIG. 13 uses like reference numerals from above where appropriate to facilitate understanding. In FIG. 13, the correction signal from output 22 of M model 16 is coherence filtered by a copy 186 of E model 40, FIG. 2. E copy 186 passes the coherent portion of the correction signal.

Figure 14:
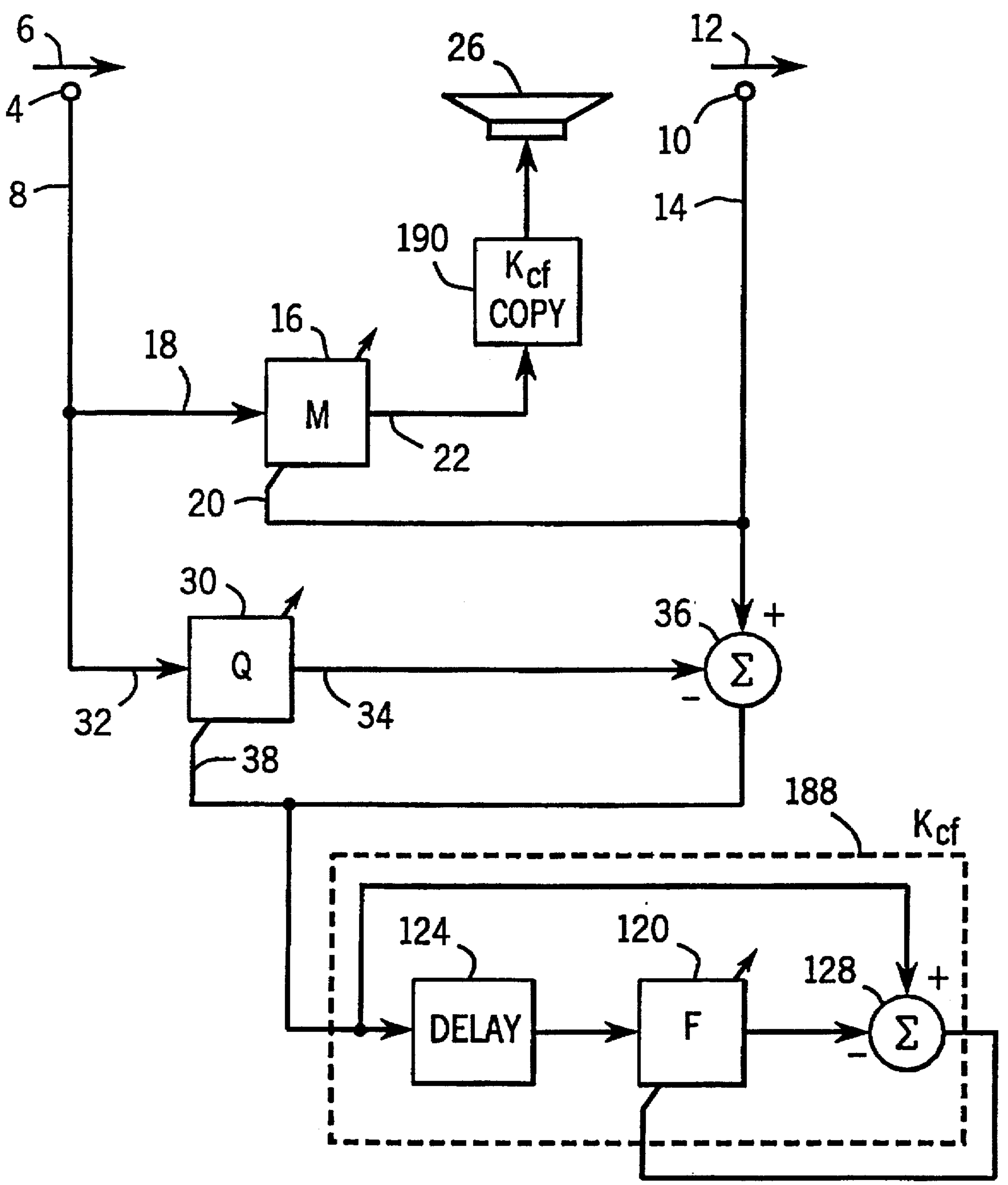
FIG. 14 schematically illustrates another implementation of a portion of the system of FIG. 1.

FIG. 14 uses like reference numerals from above where appropriate to facilitate understanding. The combination shown in dashed line provides a $K_{cf}$ coherence filter 188, like $K_{ef}$ coherence filter 132 in FIG. 4. $K_{cf}$ coherence filter 188 provides the noted $K_c$ filter 29 in FIG. 1. The correction signal is coherence filtered by $K_{cf}$ coherence filter 188, or alternatively by a copy thereof as shown at 190 in FIG. 14. Coherence filtering of the correction signal emphasizes the portion of the correction signal that corresponds to the coherent portion of the system output signal 12 at error transducer 10.

As noted above, a significant benefit of coherence filtering is the reduction of noncoherent information in the adaptive system. Another significant benefit of coherence filtering is the shaping of the error signal spectrum and/or the reference signal spectrum and/or the correction signal spectrum. In some cases, shaping of the spectrum may be more important than removing noncoherent information. In the coherence filtering methods employing F filter 120, the noncoherent information is not removed but simply normalized such that the noncoherent information at one part of the spectrum has the same magnitude as the noncoherent information at any other part of the spectrum.

It is preferred that each of models 30, 40, 60, 80, 86, 120 and 162 be provided by an IIR adaptive filter model, e.g. an RLMS algorithm filter, though other types of adaptive models may be used, including FIR models, such as provided by an LMS adaptive filter.

It is recognized that various equivalents, alternatives and modifications are possible within the scope of the appended claims.

We claim:

1. In an active adaptive control system having a first adaptive filter model, a coherence optimization system comprising first and second transducers outputting first and second signals, a second adaptive filter model determining coherence between said first and second signals, a coherence filter circuit providing coherence filtering in said adaptive control system according to said determined coherence, a reference input transducer sensing a system input signal and outputting a reference signal, an error transducer sensing a system output signal and outputting an error signal, said system input signal and said system output signal having coherent and noncoherent portions, said first adaptive filter model having a model input from said reference signal, an error input from said error signal, and a model output outputting a correction signal to an output transducer to introduce a control signal matching said system input signal, to minimize the error at said error input, wherein said second adaptive filter model has a model input from said first transducer, a model output summed at a first summer with a signal from said second transducer, and an error input from the output of said first summer, and wherein said coherence filter circuit comprises a third adaptive filter model having a model input from said error signal, a model output summed at a second summer with said model output of said second model, and an error input from the output of said second summer, said third model providing a coherence optimized filtered error signal.

2. The invention according to claim 1 wherein said second and third models are pre-trained off-line prior to active adaptive control by said first model, and wherein said third model is fixed and coherence filters said error signal during on-line operation of said first model.

3. The invention according to claim 1 wherein said second and third models are adapted during on-line active adaptive control by said first model.

4. The invention according to claim 1 comprising a fourth adaptive filter model modeling the transfer function from said output transducer to said error transducer, and a copy of said fourth model having an input from said correction signal and an output summed at a third summer with said error signal, and wherein said first summer receives the output of said third summer.

5. The invention according to claim 4 comprising a fifth adaptive filter model modeling the transfer function from said output transducer to said input transducer, and a copy of said fifth model having an input from said correction signal and an output summed at a fourth summer with said reference signal, and wherein said model input of said second model receives the output of said fourth summer.

6. The invention according to claim 1 wherein said first adaptive filter model has a first algorithm filter comprising an A filter having a filter input from said reference signal, and a second algorithm filter comprising a B filter having a filter input from said correction signal, and comprising a third summer having an input from said A filter and an input from said B filter and providing the output resultant sum as said correction signal, a fourth adaptive filter model modeling the transfer function from the outputs of said A and B filters to said error transducer, a first copy of said fourth model, a first copy of said third model, said first copy of said fourth model and said first copy of said third model being connected in series to provide a first series connection having an input from the input to said A filter, a first multiplier multiplying the output of said first series connection and a coherence filtered error signal and supplying the resultant product as a weight update signal to said A filter, a second copy of said fourth model, a second copy of said third model, said second copy of said fourth model and said second copy of said third model being connected in series to provide a second series connection having an input from the input to said B filter, a second multiplier multiplying the output of said second series connection and a coherence filtered error signal and supplying the resultant product as a weight update signal to said B filter.

7. The invention according to claim 6 comprising a third copy of said third model, and wherein said coherence filtered error signal is supplied through said third copy to said first and second multipliers.

8. The invention according to claim 7 wherein the output of said fourth summer is supplied to the model input of said third model.

9. The invention according to claim 6 comprising a fifth adaptive filter model modeling the transfer function from said output transducer to said error transducer, a copy of said fifth model having an input from said correction signal and an output summed at a fourth summer with said error signal, and wherein said first summer receives the output of said fourth summer, a sixth adaptive filter model modeling the transfer function from said output transducer to said input transducer, and a copy of said sixth model having an input from said correction signal and an output summed at a fifth summer with said reference signal, and wherein said model input of said second model receives the output of said fifth summer.

10. The invention according to claim 9 comprising first and second auxiliary noise sources, wherein an auxiliary noise source signal is supplied from said first auxiliary noise source to said third summer and to the input of said fourth model, and wherein an auxiliary noise source signal is supplied from said second auxiliary noise source to the input of said fifth model and to the input of said sixth model.

11. The invention according to claim 10 comprising a sixth summer summing the output of said third summer and the auxiliary noise source signal from said second auxiliary noise source and supplying the resultant sum to said output transducer.

12. The invention according to claim 11 comprising a seventh summer summing the output of said error transducer and the output of said fifth model and supplying the resultant sum to said fourth summer, an eighth summer summing the output of said input transducer and the output of said sixth model and supplying the resultant sum to said fifth summer, a ninth summer summing the output of said seventh summer and the output of said fourth model.

13. The invention according to claim 12 comprising a third copy of said third model having an input from said ninth summer and an output to said error input of said first model, and wherein the input to said third model is supplied from said fourth summer.

14. The invention according to claim 1 wherein said model output of said third model provides said coherence optimized filtered error signal to said error input of said first model.

15. The invention according to claim 1 comprising a copy of said third model having an input from said error signal and an output providing a coherence optimized filtered error signal to said error input of said first model.

16. In an active adaptive control system having a first adaptive filter model a coherence optimization system comprising first and second transducers outputting first and second signals, a second adaptive filter model determining coherence between said first and second signals, a coherence filter circuit providing coherence filtering in said adaptive control system according to said determined coherence, a reference input transducer sensing a system input signal and outputting a reference signal, an error transducer sensing a system output signal and outputting an error signal, said system input signal and said system output signal having coherent and noncoherent portions, said first adaptive filter model having a model input from said reference signal, an error input from said error signal and a model output outputting a correction signal to an output transducer to introduce a control signal matching said system input signal, to minimize the error at said error input, wherein said second adaptive filter model has a model input from said first transducer, a model output summed at a first summer with a signal from said second transducer, and an error input from the output of said first summer, and wherein said coherence filter circuit comprises a third adaptive filter model having a model input from the output of said first summer, a model output summed at a second summer with the output of said first summer, and an error input from the output of said second summer.

17. The invention according to claim 16 comprising a copy of the combination of said third model and said second summer, said copy having an input from said error signal and an output supplied to said error input of said first model, said output of said copy providing a coherence optimized filtered error signal.

18. The invention according to claim 17 wherein the input to said third model has a delay, and wherein said delay is included in said copy.

19. The invention according to claim 16 wherein said second and third models are pre-trained off-line prior to active adaptive control by said first model, and wherein said third model is fixed during on-line active adaptive control by said first model.

20. The invention according to claim 16 wherein said second and third models are adapted during on-line active adaptive control by said first model.

21. The invention according to claim 16 comprising a fourth adaptive filter model modeling the transfer function from said output transducer to said error transducer, and a copy of said fourth model having an input from said correction signal and an output summed at a third summer with said error signal, and wherein said first summer receives the output of said third summer.

22. The invention according to claim 21 comprising a fifth adaptive filter model modeling the transfer function from said output transducer to said input transducer, and a copy of said fifth adaptive model having an input from said correction signal and an output summed at a fourth summer with said reference signal, and wherein said model input of said second model receives the output of said fourth summer.

23. The invention according to claim 16 wherein said first adaptive filter model has a first algorithm filter comprising an A filter having a filter input from said reference signal, and a second algorithm filter comprising a B filter having a filter input from said correction signal, and comprising a third summer having an input from said A filter and an input from said B filter and providing the output resultant sum as said correction signal, a fourth adaptive filter model modeling the transfer function from the outputs of said A and B filters to said error transducer, a first copy of said fourth model, a first $K_{ef}$ copy of the combination of said third model and said second summer, said first copy of said fourth model and said first $K_{ef}$ copy being connected in series to provide a first series connection having an input from the input to said A filter, a first multiplier multiplying the output of said first series connection and a coherence filtered error signal and supplying the resultant product as a weight update signal to said A filter, a second copy of said fourth model, a second $K_{ef}$ copy of the combination of said third model and said second summer, said second copy of said fourth model and said second $K_{ef}$ copy being connected in series to provide a second series connection having an input from the input to said B filter, a second multiplier multiplying the output of said second series connection and a coherence filtered error signal and supplying the resultant product as a weight update signal to said B filter.

24. The invention according to claim 23 comprising a third $K_{ef}$ copy of the combination of said third model and said second summer, wherein said error signal is supplied through said third $K_{ef}$ copy as said coherence filtered error signal to said first and second multipliers.

25. The invention according to claim 23 comprising a fifth adaptive filter model modeling the transfer function from said output transducer to said error transducer, a copy of said fifth model having an input from said correction signal and an output summed at a fourth summer with said error signal, wherein said first summer receives the output of said fourth summer, a sixth adaptive filter model modeling the transfer function from said output transducer to said input transducer, and a copy of said fifth model having an input from said correction signal and an output summed at a fifth summer with said reference signal, wherein said model input of said second model receives the output of said fifth summer.

26. The invention according to claim 25 comprising first and second auxiliary noise sources, wherein an auxiliary noise source signal is supplied from said first auxiliary noise source to said third summer and to the input of said fourth model, and wherein an auxiliary noise source signal is supplied from said second auxiliary noise source to the input of said fifth model and to the input of said sixth model.

27. The invention according to claim 26 comprising a sixth summer summing the output of said third summer and the auxiliary noise source signal from said second auxiliary noise source and supplying the resultant sum to said output transducer.

28. The invention according to claim 27 comprising a seventh summer summing the output of said error transducer and the output of said fifth model and supplying the resultant sum to said fourth summer, an eighth summer summing the output of said input transducer and the output of said sixth model and supplying the resultant sum to said fifth summer, and a ninth summer summing the output of said seventh summer and the output of said fourth model and supplying the resultant sum to the input of said copy of said third model.

29. In an active adaptive control system having a first adaptive filter model, a coherence optimization system comprising first and second transducers outputting first and second signals, a second adaptive filter model determining coherence between said first and second signals, a coherence filter circuit providing coherence filtering in said adaptive control system according to said determined coherence, a reference input transducer sensing a system input signal and outputting a reference signal, an error transducer sensing a system output signal and outputting an error signal, said system input signal and said system output signal having coherent and noncoherent portions, said first adaptive filter model having a model input from said reference signal, an error input from said error signal, and a model output outputting a correction signal to an output transducer to introduce a control signal matching said system input signal, to minimize the error at said error input, wherein said second adaptive filter model has a model input from said first transducer, a model output summed at a summer with a signal from said second transducer, and an error input from the output of said summer, and wherein said output of said second model is supplied to said error input of said first model.

30. The invention according to claim 29 wherein said first adaptive filter model has a first algorithm filter comprising an A filter having a filter input from said reference signal, and a second algorithm filter comprising a B filter having a filter input from said correction signal, and comprising a second summer having an input from said A filter and an input from said B filter and providing the output resultant sum as said correction signal, a third adaptive filter model modeling the transfer function from the outputs of said A and B filters to said error transducer, a first copy of said third model having an input from the input to said A filter, a first multiplier multiplying the output of said first copy of said third model and a coherence optimized filtered error signal and supplying the resultant product as a weight update signal to said A filter, a second copy of said third model having an input from the input to said B filter, a second multiplier multiplying the output of said second copy of said third model and a coherence optimized filtered error signal and supplying the resultant product as a weight update signal to said B filter.

31. The invention according to claim 30 wherein the output of said second model is said coherence optimized filtered error signal supplied to said first and second multipliers.

32. The invention according to claim 30 comprising a fourth adaptive filter model modeling the transfer function from said output transducer to said error transducer, a copy of said fourth model having an input from said correction signal and an output summed at a third summer with said error signal, wherein said first summer receives the output of said third summer, a fifth adaptive filter model modeling the transfer function from said output transducer to said input transducer, a copy of said fifth model having an input from said correction signal and an output summed at a fourth summer with said reference signal, wherein said model input of said second model receives the output of said fourth summer, first and second auxiliary noise sources, wherein an auxiliary noise source signal is supplied from said first auxiliary noise source to said second summer and to the input of said third model, and wherein an auxiliary noise source signal is supplied from said second auxiliary noise source to the input of said fourth model and to the input of said fifth model, a fifth summer summing the output of said second summer and the auxiliary noise source signal from said second auxiliary noise source and supplying the resultant sum to said output transducer, a sixth summer summing the output of said error transducer and the output of said fourth model and supplying the resultant sum to said third summer, a seventh summer summing the output of said input transducer and the output of said fifth model and supplying the resultant sum to said fourth summer, an eighth summer summing the output of said copy of said fourth model and the output of said second model and supplying the resultant sum to said error input of said first model.

33. In an active adaptive control system having a first adaptive filter model, a coherence optimization system comprising first and second transducers outputting first and second signals, a second adaptive filter model determining coherence between said first and second signals, a coherence filter circuit providing coherence filtering in said adaptive control system according to said determined coherence, a reference input transducer sensing a system input signal and outputting a reference signal, an error transducer sensing a system output signal and outputting an error signal, said system input signal and said system output signal having coherent and noncoherent portions, said first adaptive filter model having a model input from said reference signal, an error input from said error signal, and a model output outputting a correction signal to an output transducer to introduce a control signal matching said system input signal, to minimize the error at said error input, wherein said second adaptive filter model has a model input from said first transducer, a model output summed at a summer with a signal from said second transducer, and an error input from the output of said summer, and wherein said coherence filter circuit comprises a copy of said second model, wherein said reference signal is supplied through said copy to said model input of said first model.

34. The invention according to claim 33 wherein the model input of said second model has a delay.

35. The invention according to claim 33 wherein said second model is pre-trained off-line prior to active adaptive control by said first model, and comprising a fixed said copy of said second model coherence filtering said reference signal during on-line operation of said first model.

36. The invention according to claim 33 wherein said first adaptive filter model has a first algorithm filter comprising an A filter having a filter input, and a second algorithm filter comprising a B filter having a filter input from said correction signal, and comprising a second summer having an input from said A filter and an input from said B filter and providing the output resultant sum as said correction signal, a third adaptive filter model modeling the transfer function from the output of said A and B filters to said error transducer, a first copy of said third model having an input from the input to said A filter, a first multiplier multiplying the output of said first copy of said third model and said error signal and supplying the resultant product as a weight update signal to said A filter, a second copy of said third model having an input from the input to said B filter, a second multiplier multiplying the output of said second copy of said third model and said error signal and supplying the resultant product as a weight update signal to said B filter, wherein said copy of said second model is at said filter input of said A filter, and said reference signal is supplied through said copy of said second model to said filter input of said A filter and to said first copy of said third model.

37. The invention according to claim 36 comprising a fourth adaptive filter model modeling the transfer function from said output transducer to said error transducer, a copy of said fourth model having an input from said correction signal and an output summed at a third summer with said error signal, wherein said first summer receives the output of said third summer, a fifth adaptive filter model modeling the transfer function from said output transducer to said input transducer, a copy of said fifth model having an input from said correction signal and an output summed at a fourth summer with said reference signal, wherein said model input of said second model receives the output of said fourth summer, first and second auxiliary noise sources, wherein an auxiliary noise source signal is supplied from said first auxiliary noise source to said second summer and to the input of said third model, and an auxiliary noise source signal is supplied from said second auxiliary noise source to the input of said fourth model and to the input of said fifth model, a fifth summer summing the output of said second summer and the auxiliary noise source signal from said second auxiliary noise source and supplying the resultant sum to said output transducer, a sixth summer summing the output of said error transducer and the output of said fourth model and supplying the resultant sum to said third summer, a seventh summer summing the output of said input transducer and the output of said fifth model and supplying the resultant sum to said fourth summer and to said copy of said second model.

38. In an active adaptive control system having a first adaptive filter model, a coherence optimization system comprising first and second transducers outputting first and second signals, a second adaptive filter model determining coherence between said first and second signals, a coherence filter circuit providing coherence filtering in said adaptive control system according to said determined coherence, a reference input transducer sensing a system input signal and outputting a reference signal, an error transducer sensing a system output signal and outputting an error signal, said system input signal and said system output signal having coherent and noncoherent portions, said first adaptive filter model having a model input from said reference signal, an error input from said error signal, and a model output outputting a correction signal to an output transducer to introduce a control signal matching said system input signal, to minimize the error at said error input, wherein said second adaptive filter model has a model input from said first transducer, a model output summed at a first summer with a signal from said second transducer, and an error input from the output of said first summer, and comprising a third adaptive filter model having a model input from said error signal, a model output summed at a second summer with said model output of said second model, and an error input from the output of said second summer, a copy of said third model having an input from said input transducer and an output to said model input of said first model and coherence filtering said reference signal supplied to said model input of said first model.

39. In an active adaptive control system having a first adaptive filter model, a coherence optimization system comprising first and second transducers outputting first and second signals, a second adaptive filter model determining coherence between said first and second signals, a coherence filter circuit providing coherence filtering in said adaptive control system according to said determined coherence, a reference input transducer sensing a system input signal and outputting a reference signal, an error transducer sensing a system output signal and outputting an error signal, said system input signal and said system output signal having coherent and noncoherent portions, said first adaptive filter model having a model input from said reference signal, an error input from said error signal, and a model output outputting a correction signal to an output transducer to introduce a control signal matching said system input signal, to minimize the error at said error input, wherein said second adaptive filter model has a model input from said first transducer, a model output summed at a first summer with a signal from said second transducer, and an error input from the output of said first summer, a third adaptive filter model having a model input from the output of said first summer, a model output summed at a second summer with the output of said first summer, and an error input from the output of said second summer, a copy of the combination of said third model and said second summer, said reference signal being supplied through said copy to said model input of said first model to provide a coherence optimized filtered reference signal thereto.

40. The invention according to claim 39 wherein said model input of said third model has a delay, and wherein said copy includes said delay.

41. In an active adaptive control system having a first adaptive filter model, a coherence optimization system comprising first and second transducers outputting first and second signals, a second adaptive filter model determining coherence between said first and second signals, a coherence filter circuit providing coherence filtering in said adaptive control system according to said determined coherence, a reference input transducer sensing a system input signal and outputting a reference signal, an error transducer sensing a system output signal and outputting an error signal, said system input signal and said system output signal having coherent and noncoherent portions, said first adaptive filter model having a model input from said reference signal, an error input from said error signal, and a model output outputting a correction signal to an output transducer to introduce a control signal matching said system input signal, to minimize the error at said error input, wherein said second adaptive filter model has a model input from said first transducer, a model output summed at a summer with a signal from said second transducer, and an error input from the output of said summer, and wherein said coherence filter circuit comprises a copy of said second model, wherein said error signal is supplied through said copy.

42. The invention according to claim 41 wherein said model input of sid second model has a delay.

43. In an active adaptive control system having a first adaptive filter model, a coherence optimization system comprising first and second transducers outputting first and second signals, a second adaptive filter model determining coherence between said first and second signals, a coherence filter circuit providing coherence filtering in said adaptive control system according to said determined coherence, a reference input transducer sensing a system input signal and outputting a reference signal, an error transducer sensing a system output signal and outputting an error signal, said system input signal and said system output signal having coherent and noncoherent portions, said first adaptive filter model having a model input from said reference signal, an error input from said error signal, and a model output outputting a correction signal to an output transducer to introduce a control signal matching said system input signal, to minimize the error at said error input, wherein said second adaptive filter model has a model input from said first transducer, a model output summed at a summer with a signal from said second transducer, and an error input from the output of said summer, and comprising a copy of said second model, wherein said correction signal is supplied through said copy.

44. The invention according to claim 43 wherein said model input of said second model has a delay.

45. In an active adaptive control system having a first adaptive filter model, a coherence optimization system comprising first and second transducers outputting first and second signals, a second adaptive filter model determining coherence between said first and second signals, a coherence filter circuit providing coherence filtering in said adaptive control system according to said determined coherence, a reference input transducer sensing a system input signal and outputting a reference signal, an error transducer sensing a system output signal and outputting an error signal, said system input signal and said system output signal having coherent and noncoherent portions, said first adaptive filter model having a model input from said reference signal, an error input from said error signal, and a model output outputting a correction signal to an output transducer to introduce a control signal matching said system input signal, to minimize the error at said error input, wherein said second adaptive filter model has a model input from said first transducer, a model output summed at a first summer with a signal from said second transducer, and an error input from the output of said first summer, and comprising a third adaptive filter model having a model input from said error signal, a model output summed at a second summer with said model output of said second model, and an error input from the output of said second summer, a copy of said third model, wherein said correction signal is supplied through said copy.

46. In an active adaptive control system having a first adaptive filter model, a coherence optimization system comprising first and second transducers outputting first and second signals, a second adaptive filter model determining coherence between said first and second signals, a coherence filter circuit providing coherence filtering in said adaptive control system according to said determined coherence, a reference input transducer sensing a system input signal and outputting a reference signal, an error transducer sensing a system output signal and outputting an error signal, said system input signal and said system output signal having coherent and noncoherent portions, said first adaptive filter model having a model input from said reference signal, an error input from said error signal, and a model output outputting a correction signal to an output transducer to introduce a control signal matching said system input signal, to minimize the error at said error input, wherein said second adaptive filter model has a model input from said first transducer, a model output summed at a first summer with a signal from said second transducer, and an error input from the output of said first summer, and comprising a third adaptive filter model having a model input from the output of said first summer, a model output summed at a second summer with the output of said first summer, and an error input from the output of said second summer, a copy of the combination of said third model and said second summer, wherein said correction signal is supplied through said copy.

47. The invention according to claim 46 wherein the input to said third model has a delay, and wherein said delay is included in said copy.

48. In an active adaptive control system having a first adaptive filter model, a coherence optimization system comprising first and second transducers outputting first and second signals, a second adaptive filter model determining coherence between said first and second signals, a coherence filter circuit providing coherence tittering in said adaptive control system according to said determined coherence, a reference input transducer sensing a system input signal and outputting a reference signal, an error transducer sensing a system output signal and outputting an error signal, said system input signal and said system output signal having coherent and noncoherent portions, said first adaptive filter model having a model input from said reference signal, an error input from said error signal, and a model output outputting a correction signal to an output transducer to introduce a control signal matching said system input signal, to minimize the error at said error input, wherein said second adaptive filter model has a model input from said first transducer, a model output summed at a summer with a signal from said second transducer, and an error input from the output of said summer.

49. The invention according to claim 48 wherein said first transducer is said reference input transducer, and said second transducer is said error transducer.

50. The invention according to claim 48 comprising a third adaptive filter model modeling the transfer function from said output transducer to said error transducer, a fourth adaptive filter model modeling the transfer function from said output transducer to said input transducer, a copy of said third adaptive filter model having an input from said correction signal and an output summed at a second summer with said error signal, wherein said first summer receives the output of said second summer, a copy of said fourth model having an input from said correction signal and an output summed at a third summer with said reference signal, wherein said model input of said second model receives the output of said third summer.

51. The invention according to claim 50 comprising an auxiliary noise source supplying an auxiliary noise source signal to the inputs of said third and fourth models.

52. The invention according to claim 51 comprising a fourth summer summing the output of said first model and said auxiliary noise source signal from said auxiliary noise source and supplying the resultant sum to said output transducer.

53. The invention according to claim 52 comprising a fifth adaptive filter model modeling the transfer function from the outputs of said A and B filters to said error transducer, a copy of said fifth model in said first model, a second auxiliary noise source supplying a random noise signal to said first and fifth models.

54. A coherence optimized active adaptive control system comprising a reference input transducer sensing a system input signal and outputting a reference signal, an error transducer sensing a system output signal and outputting an error signal, said system input signal and said system output signal having coherent and noncoherent portions, the coherent portion being cancelable, and the noncoherent portion being noncancelable, an adaptive filter model having a model input from said reference signal, an error input from said error signal, and a model output outputting a correction signal to said output transducer to introduce a control signal matching said system input signal to minimize the error at said error input, a circuit separating the error signal into cancelable and noncancelable parts and enhancing adaptation and convergence of said adaptive filter model to said coherent portion.

55. The invention according to claim 54 comprising an error filter model having a model input from said error signal, a model output summed with said cancelable part at a summer, and an error input from the output of said summer.

56. The invention according to claim 55 wherein said error filter model has reduced gain in regions of said error signal where said cancelable part is reduced.

57. The invention according to claim 55 wherein the output of said error filter model is supplied to said error input of said adaptive filter model.

58. The invention according to claim 55 comprising a copy of said error filter model, and wherein said error signal is supplied through said copy to said error input of said adaptive filter model.

59. The invention according to claim 55 comprising a copy of said error filter model, and wherein said reference signal is supplied through said copy to said model input of said adaptive filter model.

60. The invention according to claim 55 comprising a copy of said error filter model, and wherein said correction signal is supplied through said copy to said output transducer.

61. The invention according to claim 54 comprising an error filter model whitening said noncancelable part, but not said cancelable part, and focusing adaptation and convergence of said adaptive filter model to said coherent portion.

62. The invention according to claim 61 wherein said error filter model has a model input receiving said noncancelable part through a whitening element, a model output summed with said noncancelable part at a summer, and an error input from the output of said summer.

63. The invention according to claim 62 comprising a copy of said error filter model, and wherein said error signal is supplied through said copy to said error input of said adaptive filter model.

64. The invention according to claim 62 comprising a copy of said error filter model, and wherein said reference signal is supplied through said copy to said model input of said adaptive filter model.

65. The invention according to claim 62 comprising a copy of said error filter model, and wherein said correction signal is supplied through said copy to said output transducer.

66. The invention according to claim 62 comprising a copy of said error filter model and said whitening element and said summer, and wherein said error signal is supplied through said copy to said error input of said adaptive filter model.

67. The invention according to claim 62 comprising a copy of said error filter model and said whitening element and said summer, and wherein said reference signal is supplied through said copy to said model input of said adaptive filter model.

68. The invention according to claim 62 comprising a copy of said error filter model and said whitening element and said summer, and wherein said correction signal is supplied through said copy to said output transducer.

69. The invention according to claim 54 comprising an error filter model having a model input from said reference signal, a model output summed with said error signal at a summer, and an error input from the output of said summer, said model output of said error filter model providing said cancelable part, said output of said summer providing said noncancelable part.

70. The invention according to claim 69 comprising a copy of said error filter model, and wherein said reference signal is supplied through said copy to said model input of said adaptive filter model.

71. The invention according to claim 69 comprising a copy of said error filter model, and wherein said error signal is supplied through said copy to said error input of said adaptive filter model.

72. The invention according to claim 69 comprising a copy of said error filter model, and wherein said correction signal is supplied through said copy to said output transducer.

73. The invention according to claim 69 comprising a delay element at said model input of said error filter model matching the propagation delay of the system input signal from said reference input transducer to said error transducer.

* * * * *